US009515955B2

(12) United States Patent
Arikatla et al.

(10) Patent No.: US 9,515,955 B2
(45) Date of Patent: Dec. 6, 2016

(54) GLOBAL SERVER LOAD BALANCING WITH QUEUED MESSAGING

(71) Applicant: Verizon Patent and Licensing Inc., Basking Ridge, NJ (US)

(72) Inventors: Chenchu Rama Prasad Arikatla, Temple Terrace, FL (US); Ramesh Babu Ramakrishnan, Flower Mound, TX (US); Ajay J. Vora, Tampa, FL (US); Sanjay Basu, Plano, TX (US); Lawrence G. Bronson, Tampa, FL (US); Chaitanya S. Vaddey, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 370 days.

(21) Appl. No.: 14/102,948

(22) Filed: Dec. 11, 2013

(65) Prior Publication Data

US 2015/0163161 A1 Jun. 11, 2015

(51) Int. Cl.
*G06F 15/173* (2006.01)
*H04L 12/911* (2013.01)
(Continued)

(52) U.S. Cl.
CPC ............ *H04L 47/726* (2013.01); *G06F 9/505* (2013.01); *G06F 9/5083* (2013.01);
(Continued)

(58) Field of Classification Search
CPC .... H04L 47/726; H04L 47/70; H04L 67/1074; H04L 45/026
(Continued)

(56) References Cited

U.S. PATENT DOCUMENTS 8,681,671 B1 * 3/2014 Hui ................... H04W 52/0225
370/311
2010/0293353 A1 * 11/2010 Sonnier ................. G06F 15/167
711/170

(Continued)

OTHER PUBLICATIONS

IBM, "WebSphere software", http://www-01.ibm.com/software/websphere/, Nov. 12, 2004, 1 page.
(Continued)

*Primary Examiner* — Michael Y Won
*Assistant Examiner* — Karina J Garcia-Ching

(57) ABSTRACT

A device may receive a request for messaging from a client device, and may determine a set of available data centers, of multiple of data centers, based on data received on a set of networking ports of the device. The device may configure a set of local queue managers to provide messaging to a set of external queue managers based on determining the set of available data centers. The device may assign the request to a particular local queue manager associated with providing messaging to a particular external queue manager that is associated with a particular data center. The device may provide the request to the particular data center via the particular local queue manager and a particular external queue manager associated with the particular data center, and may determine a reference identifier based on providing the request.

20 Claims, 23 Drawing Sheets

(51) Int. Cl.
*H04L 12/751* (2013.01)
*H04L 29/08* (2006.01)
*G06F 9/50* (2006.01)

(52) U.S. Cl.
CPC ............ *H04L 45/026* (2013.01); *H04L 47/70* (2013.01); *H04L 67/1008* (2013.01); *H04L 67/1017* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 2012/0271909 | A1* | 10/2012 | Huang | ................ H04L 61/1511 709/217 |
| 2013/0332597 | A1* | 12/2013 | Kumar | ................ H04L 67/1008 709/224 |

OTHER PUBLICATIONS

Microsoft, ".Net Technology Guidance",http://www.microsoft.com/net/nettechnologyguidance, Jun. 27, 2013, 2 pages.

Hiscock et al., "Understanding high availability with WebSphere MQ", International Business Machines Corporation, May 11, 2005, 34 pages.

IBM, "Multi-instance queue managers", http://publib.boulder.ibm.com/infocenter/wmqv7/v7r0/index.isp?topic=%2Fcom.ibm.mq.arnowag.doc%2Fla31000_.htm, Oct. 1, 2013, 3 pages.

Oracle, "Oracle Web Log is Server", http://www.oracle.com/us/products/middleware/cloud-app-foundation/weblogic/overview/index.html, Jul. 12, 2013, 2 pages.

Citrix, "Citrix NetScaler Getting Started Guide", Citrix NetScaler 10, Citrix Systems, Inc., http://support.citrix.com/servlet/KbServlet/download/30562-102-691335/NS-GettingStarted-Guide-EN.pdf, 2012, 147 pages.

* cited by examiner

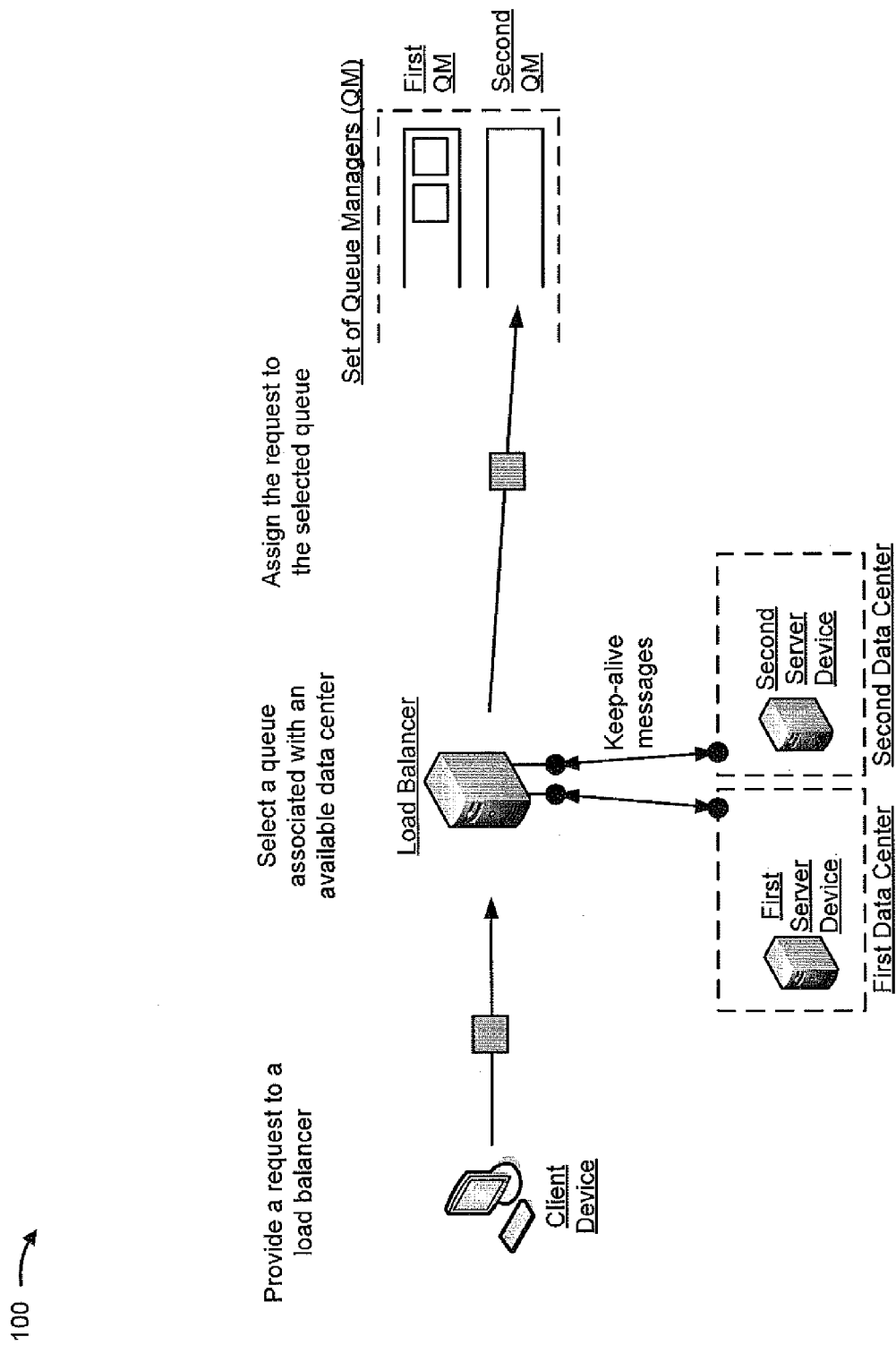

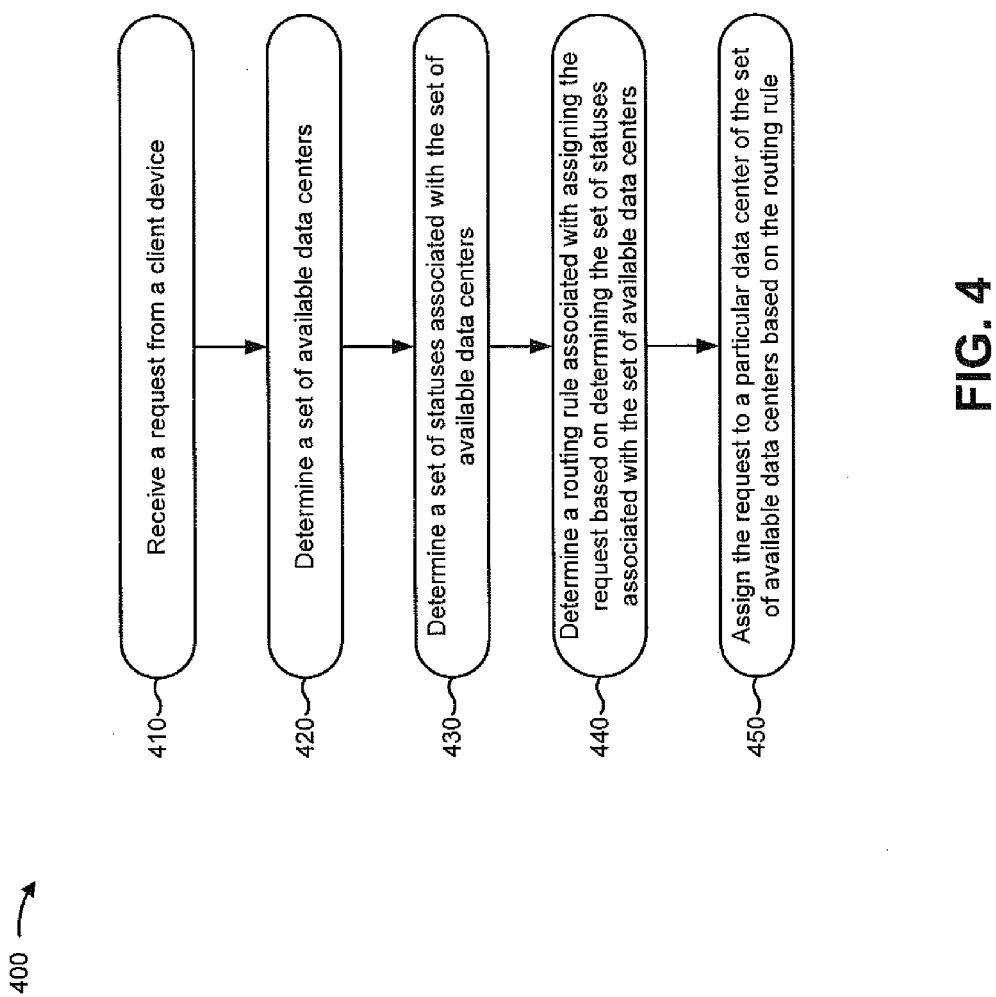

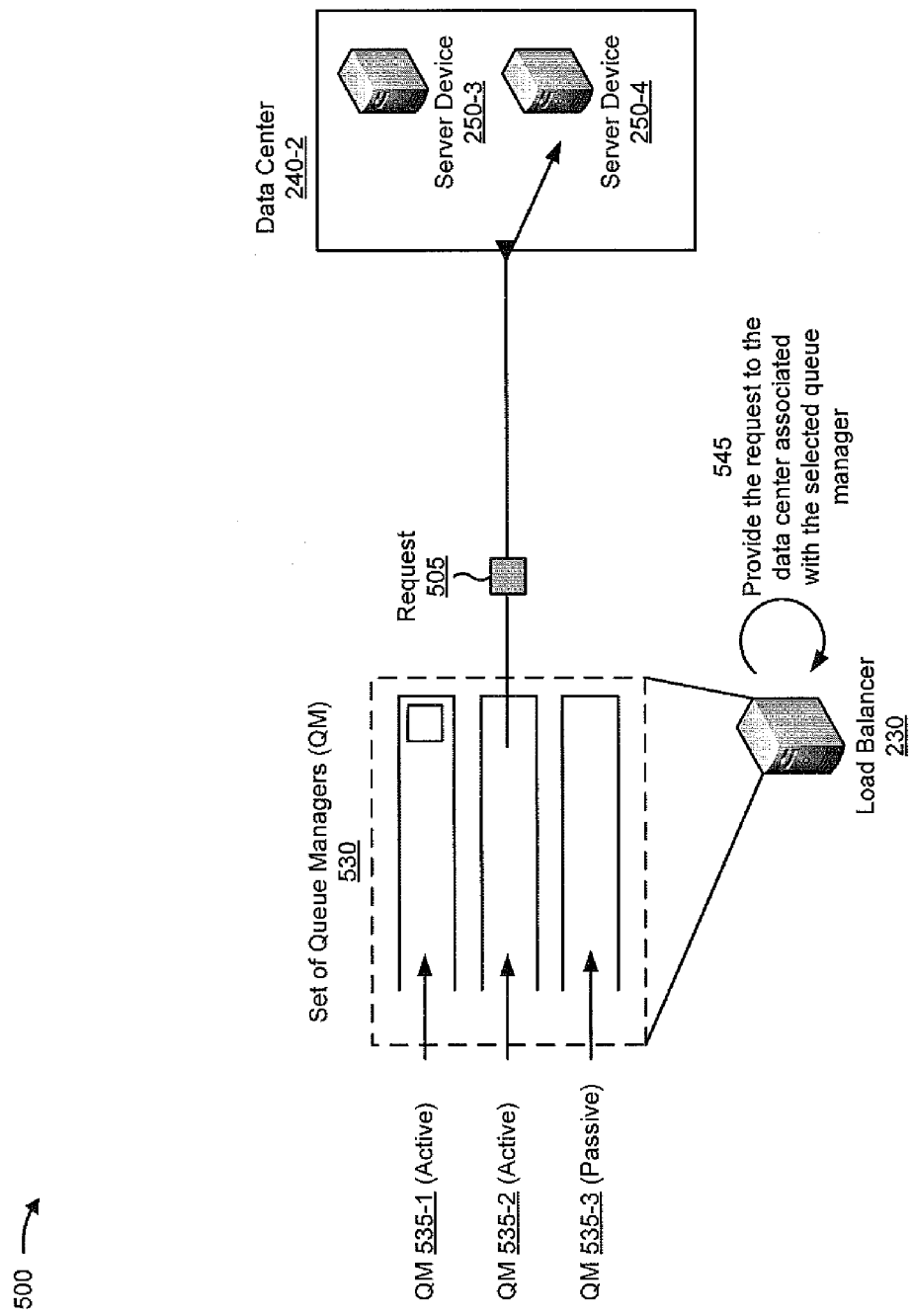

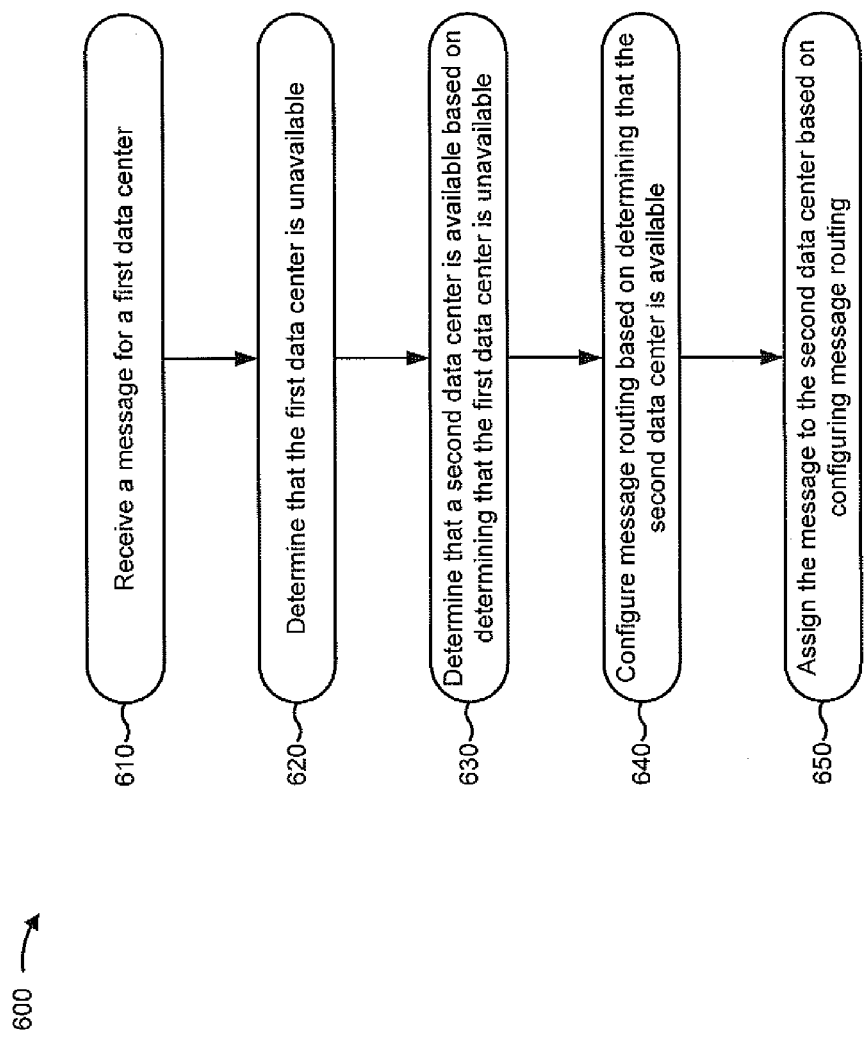

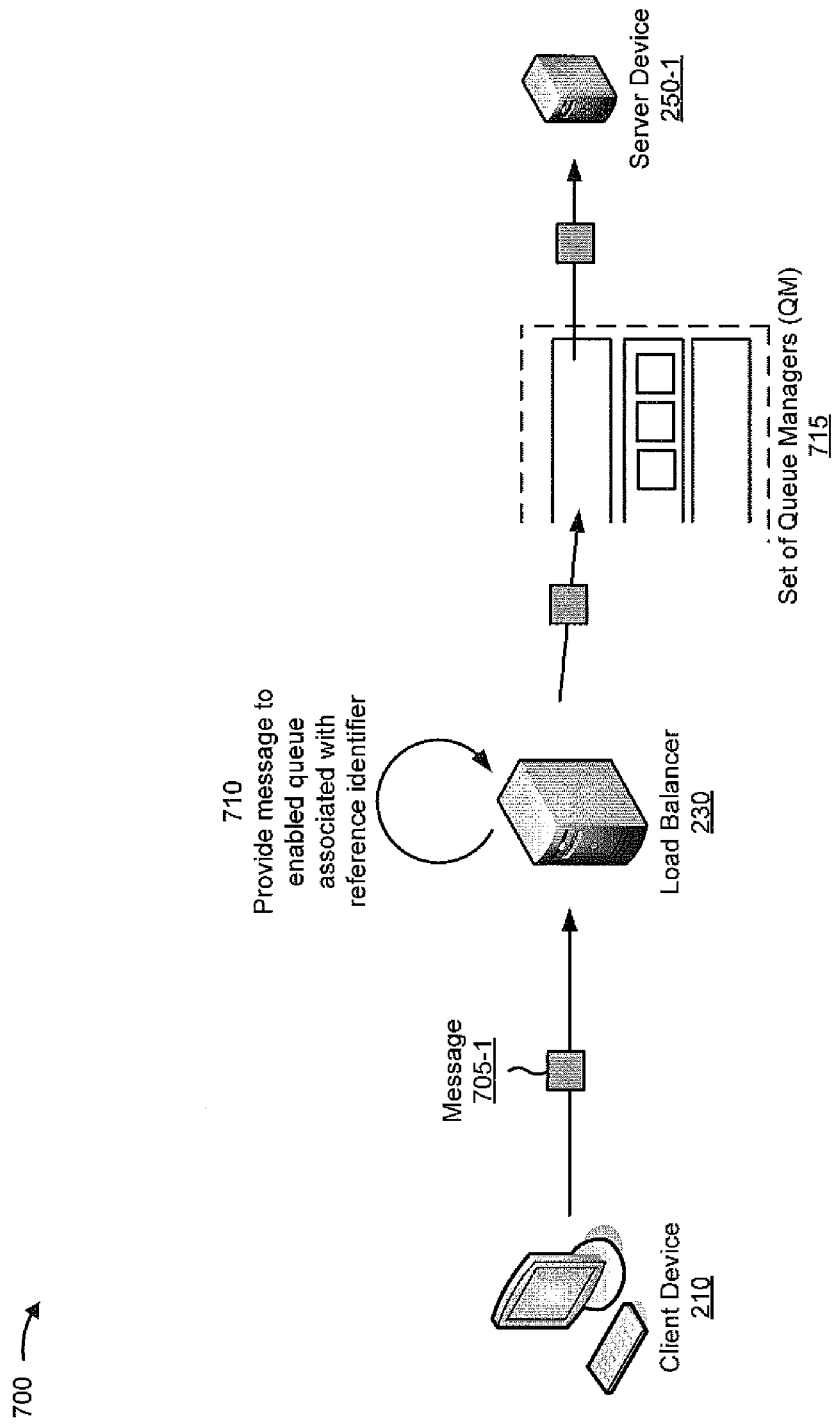

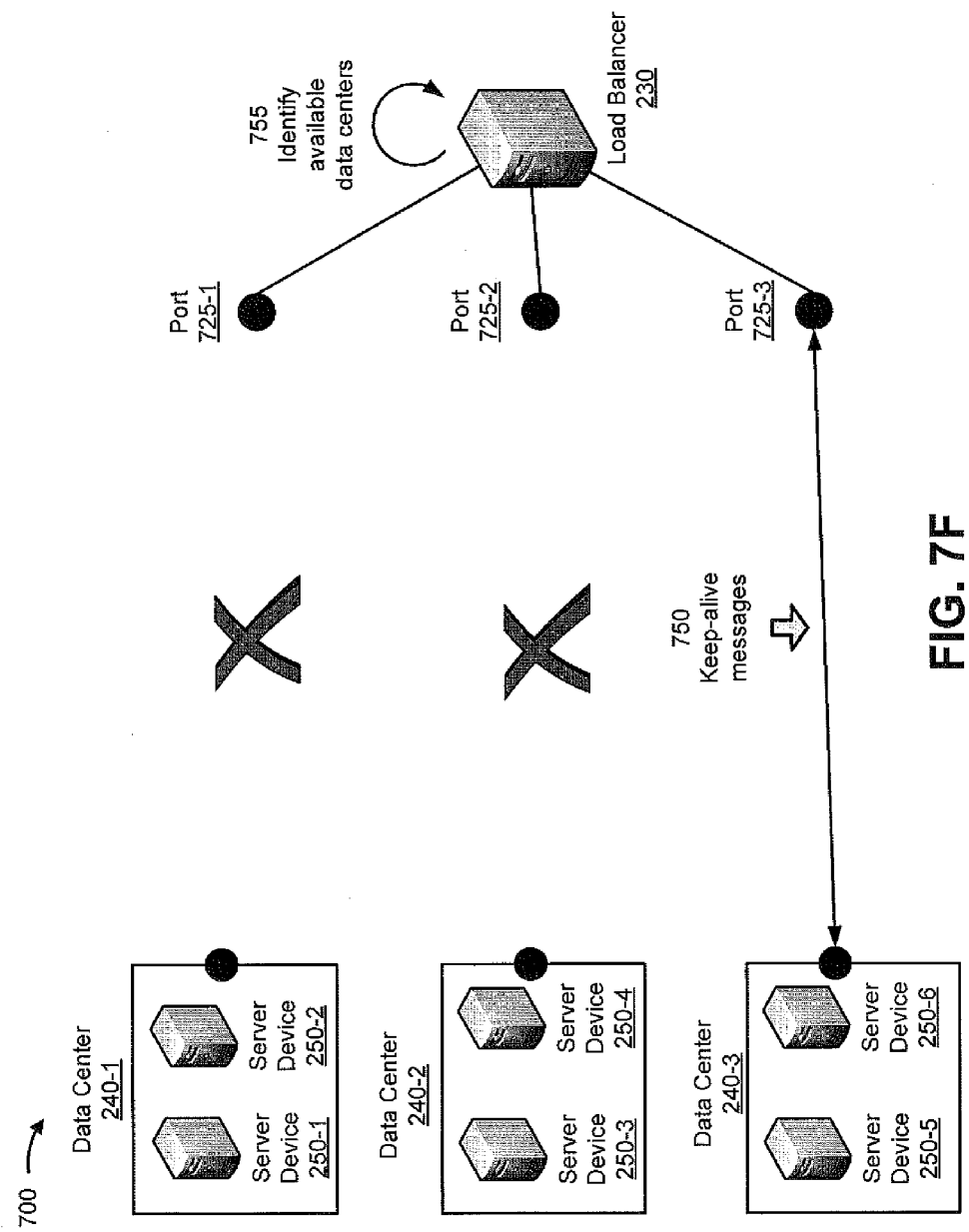

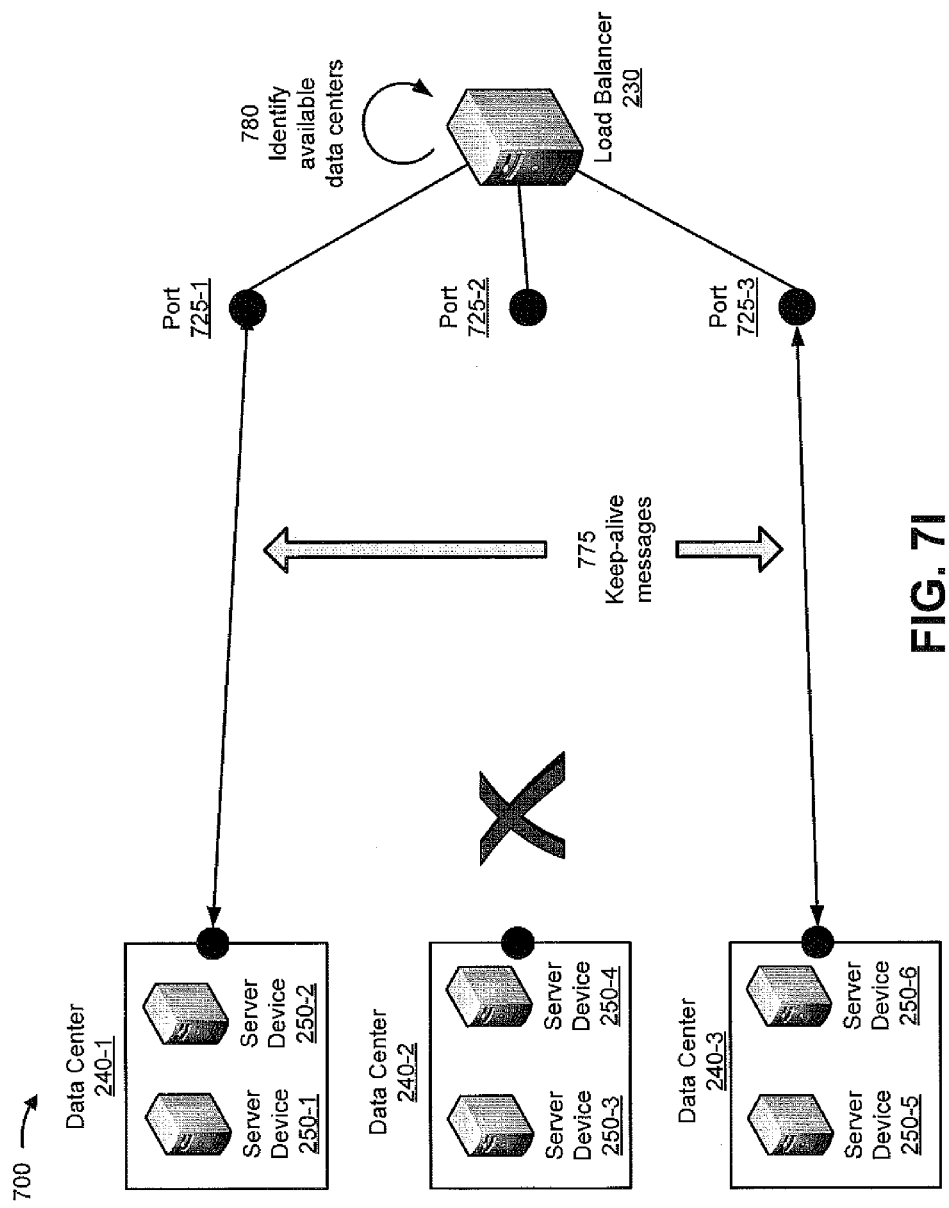

GLOBAL SERVER LOAD BALANCING WITH QUEUED MESSAGING

BACKGROUND

One or more server devices may be clustered within a data center. The data center may include a queue manager for receiving a message, such as a request for information, a request for processing, a request reply, or the like. The queue manager may distribute the message to a server device of the one or more server devices.

BRIEF DESCRIPTION OF THE DRAWINGS

FIGS. 1A and 1B are diagrams of an overview of an example implementation described herein;

FIG. 4 is a flow chart of an example process for assigning a request for messaging with a client device;

FIGS. 5A-5F are diagrams of an example implementation relating to the example process shown in FIG. 4;

FIG. 6 is a flow chart of an example process for re-assigning a client device messaging connection with a data center; and FIGS. 7A-7K are diagrams of an example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A client device may provide a message to a data center for processing. The data center may be configured to include a set of server devices. The data center may receive the message, and may provide the message to a server device of the set of server devices. However, a data center may be overloaded by multiple messages, and a data center failure may result in negative customer experience. Implementations described herein may facilitate message load balancing between multiple data centers and message connection re-assignment upon data center failure.

Figure 1B:
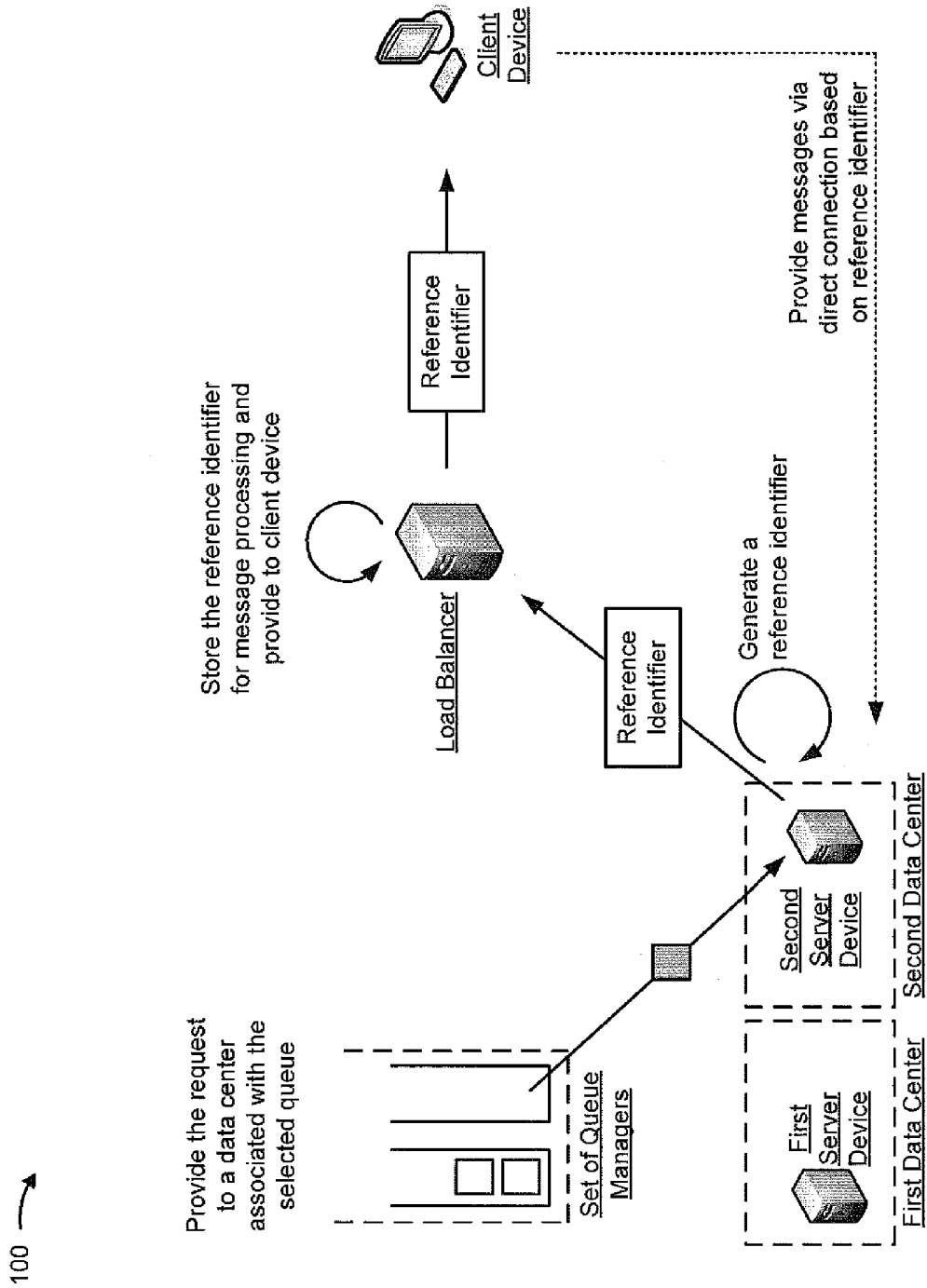

FIGS. 1A and 1B are diagrams of an overview of an example implementation 100 described herein. Example implementation 100 may include a client device, a load balancer, a first data center (e.g., that includes a first server), and a second data center (e.g., that includes a second server). As shown in FIG. 1A, the client device may provide a request, such as a request for messaging, a request for processing, a request for information from a database, etc., to the load balancer. The load balancer may receive the request, and may identify a set of available data centers (e.g., associated with a set of server devices). For example, the load balancer may provide a message (e.g., a keep-alive message, a ping, etc.) to a particular data center (e.g., the first data center, the second data center, etc.) to determine that the particular data center is available. The load balancer may include a set of queue managers, and may configure the set of queue managers, based on identifying the set of available data centers, to include a first queue manager associated with the first data center and a second queue manager associated with the second data center.

The load balancer may select a queue manager associated with providing the request to an available data center based on identifying the set of available data centers, based on a status associated with a particular data center of the set of available data centers (e.g., a backup status, an active status, etc.), based on a routing rule (e.g., a round-robin routing rule, a weighted routing rule, etc.), or the like. For example, when the first queue manager includes two queued messages to be provided to the first data center, and when the second queue manager does not include a queued message to be provided to the second data center, the load balancer may select the second queue manager. In another example, the second data center may be configured to backup the first data center. In this case, the load balancer may select the first queue manager when the first data center is available. The load balancer may assign the request to the selected queue manager.

As shown in FIG. 1B, the load balancer may provide the request from a queue manager to a data center, and the request may be received by a server device associated with the data center. For example, the load balancer may provide the request from the second queue manager to the second server device associated with the second data center. The load balancer may receive a reference identifier to be used in establishing a direct connection for messaging between the client device and the server device. The load balancer may store the reference identifier for message processing (e.g., for forwarding messages), and may provide the reference identifier to the client device.

A request may refer to information provided from a client device to a load balancer to establish a messaging connection with a server device (e.g., associated with a data center). For example, the client device may request that the load balancer establish messaging with a billing server device to complete a transaction, and the load balancer may provide a reference identifier to be used for forwarding messages from the client device to the billing server device. In this way a load balancer may assign a request to establish messaging between a client device and a server device associated with a data center.

A message may refer to inter-system, inter-process, etc., communication, such as may be facilitated by a message-oriented middleware service, such as IBM WebSphere MQ, Oracle Advanced Queuing, Java Message Service, or the like. For example, when transacting with a billing server device, a client device may provide, to the billing server device, a message including transaction information. In some implementations, the message may include a reference identifier that may be used by a load balancer to forward the message.

Figure 2:
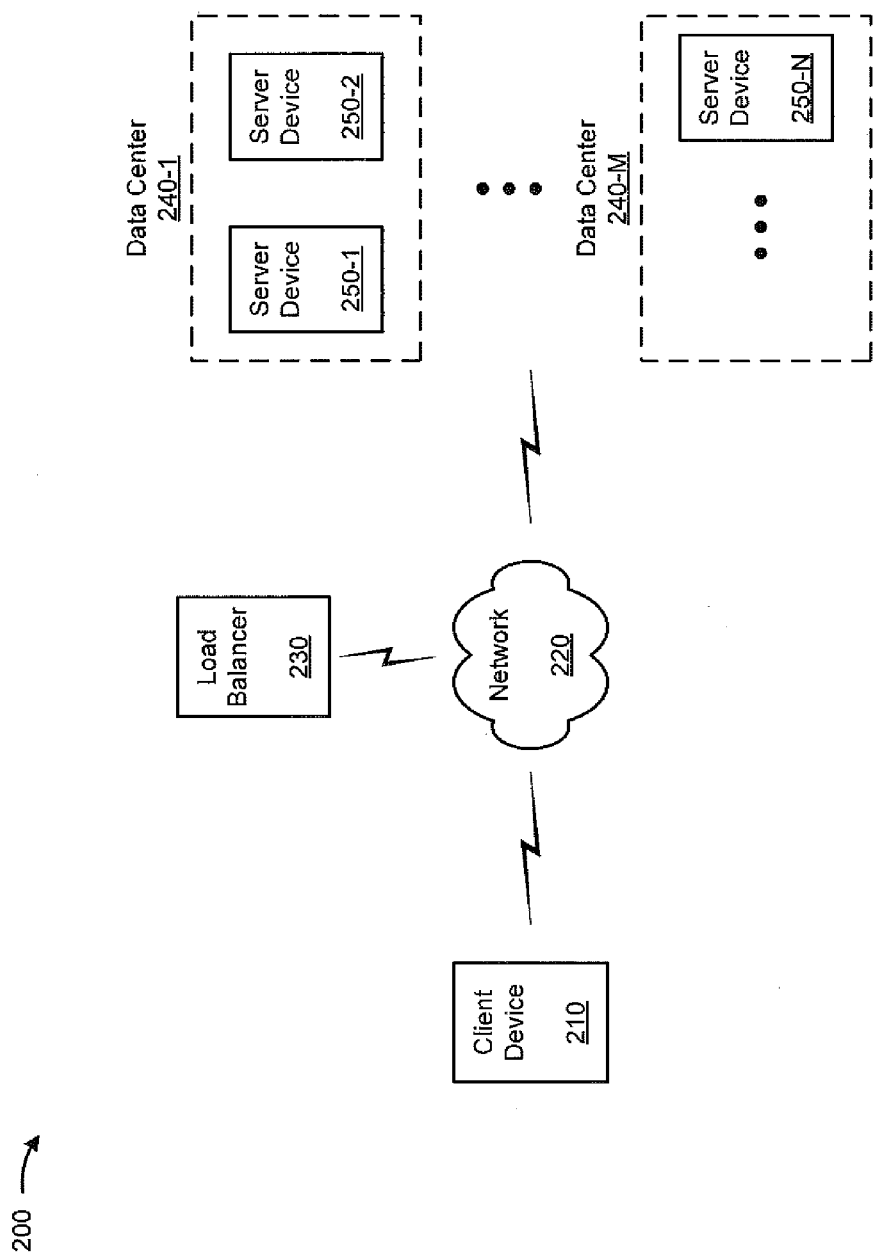
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 210, network 220, load balancer 230, data center 240-1 to 240-M (M≥1) (hereinafter referred to collectively as "data centers 240," and individually as "data center 240"), and server device 250-1 to 250-N(N≥1) (hereinafter referred to collectively as "server devices 250," and individually as "server devices 250"). Devices of environment 200 may interconnect via wired connections, wireless connections, or a combination of wired and wireless connections.

Client device 210 may include one or more devices capable of receiving, generating, processing, storing, and/or providing information associated with establishing a messaging connection to a data center (e.g., a connection that may facilitate transmission of a message, such as via synchronous transmission, asynchronous transmission, or the like). For example, client device 210 may include a computer (e.g., a desktop computer, a laptop computer, a tablet computer), a mobile phone (e.g., a smart phone), a server, etc. capable of providing a message to data center 240 (e.g., for processing by server device 250). In some implementations, client device 210 may include a message-oriented middleware service, such as a message queue, or the like, for communicating with server device 250.

Network 220 may include one or more wired and/or wireless networks. For example, network 220 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, load balancer 230 may receive a request from client device 210, and may provide messaging between client device 210 and data center 240 (e.g., to be processed by server device 250) via network 220.

Load balancer 230 may include one or more devices capable of receiving, generating, processing, storing, and/or providing information associated with a request for messaging. For example, load balancer 230 may include a server, a gateway, a bridge, a hub, a switch, etc. that facilitates a global load balancing service (e.g., a global domain name system load balancing service). In some implementations, load balancer 230 may direct the request for messaging to an available data center 240. In some implementations, load balancer 230 may include a message-oriented middleware service (e.g., that includes a message queue, a message queue manager, or the like), a dynamic Internet Protocol (IP) address router, a port listener (e.g., a keep-alive listener, such as an Hypertext Transport Protocol (HTTP) listener, a transmission control protocol (TCP) listener, or the like), etc.

Data center 240 may include one or more devices capable of receiving, generating, processing, storing, and/or providing information associated with one or more server devices 250. For example, data center 240 may include one or more hardware devices associated with routing messages to server device 250, such as a gateway, a router, a switch, a hub, a bridge, or the like. In some implementations, data center 240 may include a data center load balancer associated with balancing workload between multiple server devices 250. In some implementations, data center 240 may include a queue manager associated with receiving a message and/or providing the message to server device 250. In some implementations, data center 240 may provide information associated with the availability of one or more server devices 250 to load balancer 230 (e.g., via network 220). In some implementations, multiple data centers 240 may be associated with a cluster.

Server device 250 may include one or more devices capable of receiving, generating, processing, storing, and/or providing information associated with a message. For example, server device 250 may include a server, a computer, a computer cluster, a central processing unit ("CPU"), a graphical processing unit ("GPU"), a graphics accelerator processor, a disk drive, a memory unit, a renderer, or the like. In some implementations, server device 250 may include one or more data structures, such as a data structure associated billing, provisioning, or the like. In some implementations, one or more server devices 250 may be associated with data center 240.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
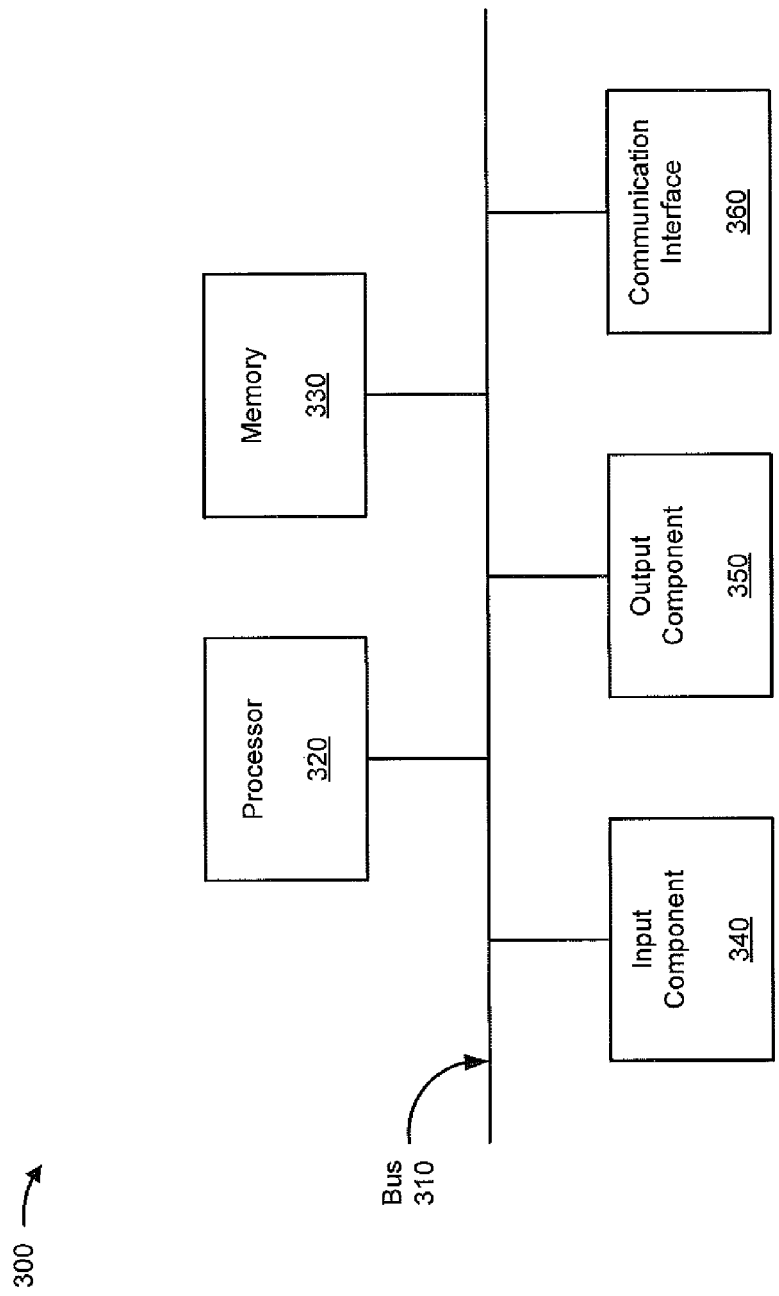
FIG. 3 is a diagram of example components of one or more devices of FIG. 2.

FIG. 3 is a diagram of example components of a device 300. Device 300 may correspond to client device 210, load balancer 230, data center 240, and/or server device 250. In some implementations, each of client device 210, load balancer 230, data center 240, and/or server device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

FIG. 4 is a flow chart of an example process for assigning a request for messaging with a client device. In some implementations, one or more process blocks of FIG. 4 may be performed by load balancer 230. Additionally, or alternatively, one or more process blocks of FIG. 4 may be performed by another device or a group of devices separate from or including load balancer 230, such as client device 210, data center 240, and/or server device 250.

As shown in FIG. 4, process 400 may include receiving a request from a client device (block 410). For example, load balancer 230 may receive the request from client device 210. A request may refer to a message that is provided to establish a messaging connection between a client device and a server device, such as an asynchronous messaging connection, or the like. For example, client device 210 may provide the request to load balancer 230, and load balancer 230 may determine a particular data center 240 that is to process the request via a server device 250. Additionally, or alternatively, load balancer 230 may determine a particular server device 250 associated with the particular data center 240 that is to process the request. In some implementations, the request may include information associated with a domain name system (DNS) query, such as information identifying a DNS name, a particular load balancer 230, an originating Internet Protocol (IP) address (e.g., an IP address associated with client device 210), a particular service to be provided (e.g., a billing transaction service, a provisioning service, etc.), or the like.

As further shown in FIG. 4, process 400 may include determining a set of available data centers (block 420). For example, load balancer 230 may determine the set of available data centers 240. An available data center may refer to a data center that includes one or more server devices 250 capable of processing to a request. An unavailable data center may refer to a data center that does not include a server device 250 capable of processing a request. For example, data center 240 may be unavailable when data center 240 is undergoing a scheduled maintenance procedure, an unscheduled maintenance procedure, a forced downtime (e.g., a downtime associated with a virus, an error, a power outage, a denial of service attack, etc.), or the like.

Load balancer 230 may determine the set of available data centers 240 based on establishing a listener, in some implementations. For example, load balancer 230 may establish a keep-alive listener associated with data center 240. In this case, load balancer 230 may determine availability based on a set of keep-alive messages exchanged between with load balancer 230 and a set of data centers 240. In some implementations, load balancer 230 may establish the keep-alive listener by opening a socket on a particular port. For example, load balancer 230 may associate a first port with a first keep-alive listener for a first data center 240, and may associate a second port with a second keep-alive listener for a second data center 240. Additionally, or alternatively, load balancer 230 may associate a particular port with a keep-alive listener for a particular server device 250 associated with a particular data center 240. Additionally, or alternatively, load balancer 230 may monitor multiple data centers 240 and/or multiple server devices 250 via a particular port.

Load balancer 230 may determine the set of available data centers 240 when the request is received, in some implementations. For example, load balancer 230 may update a keep-alive listener based on receiving the request. Additionally, or alternatively, load balancer 230 may determine the set of available data centers 240 based on a threshold quantity of time, a threshold quantity of received requests, or the like.

Load balancer 230 may configure a set of queue managers associated with data center 240 based on determining the set of available data centers 240, in some implementations. A queue manager may refer to a communication protocol that facilitates messaging from a sending queue to a receiving queue. A queue manager may include a set of queues. For example, load balancer 230 may be associated with a set of queue managers with a first queue manager associated with communication to a first data center 240 and a second queue manager associated with communication to a second data center 240. In some implementations, load balancer 230 may configure the set of queue managers to enable a particular queue manager. An enabled queue manager may refer to a queue manager that includes a queue (e.g., a sending queue) that may be assigned a message, such as a request, a response, an acknowledgement, or the like, to be provided to another queue (e.g., a receiving queue). For example, when load balancer 230 determines that first data center 240 is available, load balancer 230 may enable the first manager queue (e.g., configure the first manager queue to be assigned messages that are to be provided to first data center 240). Additionally, or alternatively, when load balancer 230 determines first data center 240 to be unavailable, load balancer 230 may disable the first queue manager (e.g., configure the first queue manager to be unable to receive messages that are to be provided to first data center 240).

As further shown in FIG. 4, process 400 may include determining a set of statuses associated with the set of available data centers (block 430). For example, load balancer 230 may determine the set of statuses associated with the set of available data centers 240. A status may refer to a configuration of a data center, and may be associated with a preferentiality with which a request is to be provided to the data center. For example, a particular status may include a particular preferentiality with which load balancer 230 is to assign the request to the data center. In some implementations, a status may be associated with a particular server device 250 of data center 240. For example, data center 240 may include an active server device 250 (e.g., a primary server device 250) and a passive server device 250 (e.g., a backup server device 250)

In some implementations, load balancer 230 may determine an active status for data center 240. For example, when load balancer 230 determines that data center 240 is associated with an active status (e.g., indicating that data center 240 is configured to be provided messages), load balancer 230 may provide a request to data center 240. In some implementations, load balancer 230 may determine a passive status for data center 240 (e.g., indicating that data center 240 is configured to back up other data centers 240). For example, when load balancer 230 determines that a particular data center 240 is associated with a passive status, load balancer 230 may provide the request to another data center 240 (e.g., that is associated with an active status). In this case, the particular data center 240 may receive the request when load balancer 230 is unable to identify an active data center 240. In some implementations, load balancer 230 may determine another status associated with data center 240, such as an inactive status (e.g., indicating that the request is not to be provided to data center 240), a hybrid status (e.g., indicating that a request for a particular service is to be provided to data center 240, and another request for another service is to be provided to another data center 240), or the like.

Load balancer 230 may determine the set of statuses based on querying a data structure, in some implementations. For example, load balancer 230 may access stored information associated with identifying the set of statuses. Additionally, or alternatively, load balancer 230 may query the set of available data centers 240 to determine the set of statuses.

Load balancer 230 may update the set of statuses associated with the set of available data centers 240 when the request is received, in some implementations. Additionally, or alternatively, load balancer 230 may update the set of statuses when a threshold period of time is satisfied. Additionally, or alternatively, load balancer 230 may update the set of statuses when load balancer 230 has received a threshold quantity of requests. In some implementations, load balancer 230 may adjust the set of statuses based on determining the set of available data centers 240. For example, when first data center 240 is configured to back up second data center 240 (e.g., a passive status), and when second data center 240 is unavailable, load balancer 230 may configure first data center 240 to be associated with an active status.

As further shown in FIG. 4, process 400 may include determining a routing rule associated with assigning the request based on determining the set of statuses associated with the set of available data centers (block 440). For example, load balancer 230 may determine the routing rule associated with selecting a particular data center 240 from the set of available data centers 240. In some implementations, load balancer 230 may select the routing rule based on stored information associated with assigning requests. Additionally, or alternatively, load balancer 230 may receive information associated with assigning requests (e.g., from a control server, etc.).

Load balancer 230 may determine a routing rule indicating that the request is to be assigned based on data center status. For example, when load balancer 230 determines that the set of available data centers 240 includes active data center 240 and multiple passive data centers 240, the selected routing rule may indicate that load balancer 230 is to assign the request to active data center 240. Additionally, or alternatively, load balancer 230 may determine a routing rule associated with selecting a particular active data center 240, of multiple active data centers 240, such as a round-robin routing rule (e.g., a routing rule that rotates selection among multiple active data centers 240), a workload weighted routing rule (e.g., a routing rule that assigns the request to a particular active data center 240 associated with a smallest workload compared to other active, available data centers 240), or the like.

In some implementations, load balancer 230 may determine the routing rule based on a length of a queue associated with a particular queue manager of the set of queue managers. The length of a queue may refer to a quantity of messages to be provided to a particular data center 240 associated with the particular queue manager. For example, load balancer 230 may determine that a first queue has a first length, and a second queue has a second length that is shorter than the first length (e.g., the second queue includes fewer messages than the first queue). In this case, load balancer 230 may select a particular routing rule that balances the length of the first queue and the second queue by indicating that the request is to be assigned to a queue manager including the second queue.

Load balancer 230 may update the routing rule based on determining a change of status and/or availability associated with data center 240. For example, when load balancer 230 determines that a quantity of available data centers 240 has been adjusted (e.g., based on a particular data center 240 no longer being available), load balancer 230 may determine a routing rule associated with the new quantity of available data centers 240.

As further shown in FIG. 4, process 400 may include assigning the request to a particular data center of the set of available data centers based on the routing rule (block 450). For example, load balancer 230 may assign the request to the particular data center 240 of the set of available data centers 240. In this case, the particular data center 240 may be selected based on the routing rule, the set of available data centers 240, and/or the set of statuses. In some implementations, load balancer 240 may provide the request based on assigning the request. For example, load balancer 230 may provide the request to the particular data center 240 via a queue manager. In this case, load balancer 230 may include a local queue manager of the set of queue managers connected to an external queue manager (e.g., associated with the particular data center 240), and may provide the request from the local queue manager to the external queue manager.

In some implementations, the set of queue managers associated with load balancer 230 may include a set of sending queue managers that include a set of sending queues (e.g., local queue managers that include a set of local queues). For example, a local queue manager may include a first local queue associated with providing a first message (e.g., a request, a reply, a response, etc.) to a first server device 250 associated with data center 240, and a second local queue associated with providing a second message to a second device 250 associated with data center 240. In this case, load balancer 230 may assign the request to a sending queue associated with the particular server device 250, and the local queue manager may provide the request from the sending queue to a receiving queue associated the particular server device 250 (e.g., an external queue). Additionally, or alternatively, load balancer 230 may provide information instructing a local queue manager associated with load balancer 230 to provide the request from the sending queue to an external queue manager (e.g., that includes the receiving queue) associated with the particular data center 240.

In some implementations, load balancer 230 may provide information associated with assigning the request to a particular server device 250 when assigning the request to the particular data center 240. For example, load balancer 230 may provide information to the particular data center 240 indicating that the particular server device 250 is to receive the request. Additionally, or alternatively, the particular data center 240 may assign the request to the particular server device 250 based on a scheduling rule associated with the particular data center 240.

In some implementations, load balancer 230 may determine a reference identifier for other messages between client device 210 and the particular data center 240, when assigning the request to the particular data center 240. For example, load balancer 230 may receive an acknowledgement of the request from server device 250, and the acknowledgement may include a reference identifier. Additionally, or alternatively, load balancer 230 may generate a reference identifier associated with establishing messaging between client device 210 and the particular data center 240 based on providing the request. In some implementations, load balancer 230 may store an indication of the reference identifier, provide the indication of the reference identifier (e.g., to client device 210, the particular data center 240, server device 250, etc.), or the like. Additionally, or alternatively, load balancer 230 may generate a reference identifier that includes information associated with establishing a direct connection between client device 210 and the particular data center 240, such as an IP address, a virtual IP address, a DNS name, or the like.

In this way, a load balancer may assign a request to establish messaging between a client device and a server device associated with a data center.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
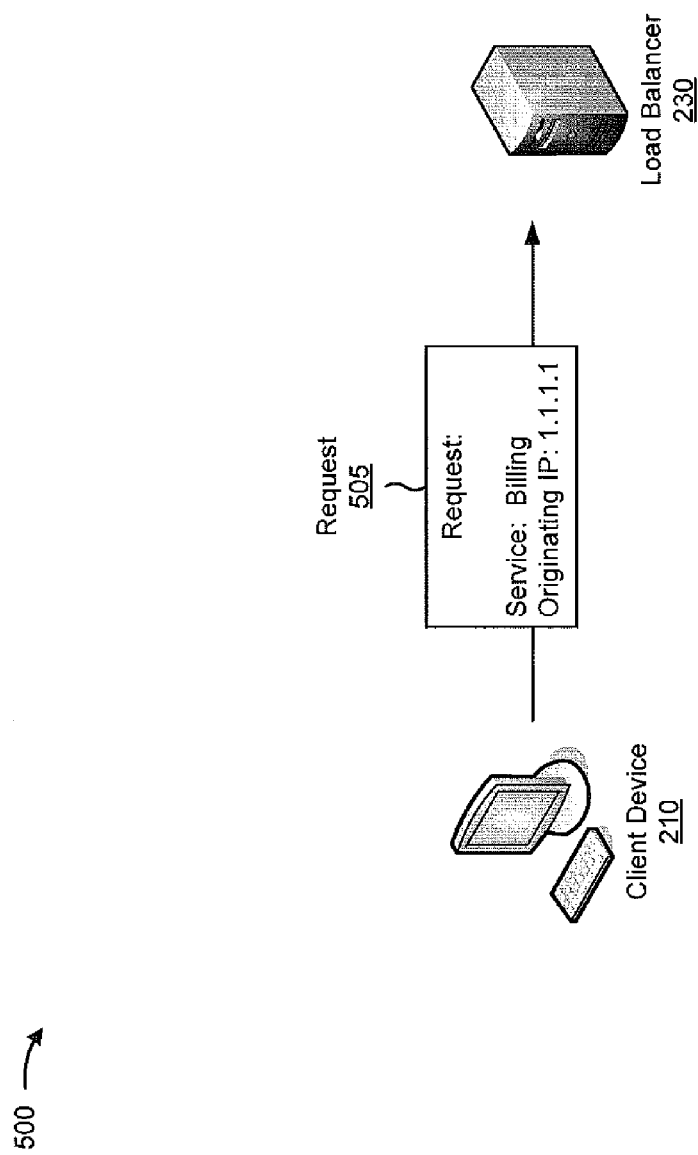

FIGS. 5A-5F are diagrams of an example implementation 500 relating to process 400 shown in FIG. 4. As shown in FIG. 5A, example implementation 500 includes client device 210 and load balancer 230. Load balancer 230 receives request 505 from client device 210. Request 505 identifies a particular service to be provided (e.g., "Billing") and an originating IP address associated with client device 210 (e.g., "1.1.1.1").

Figure 5B:
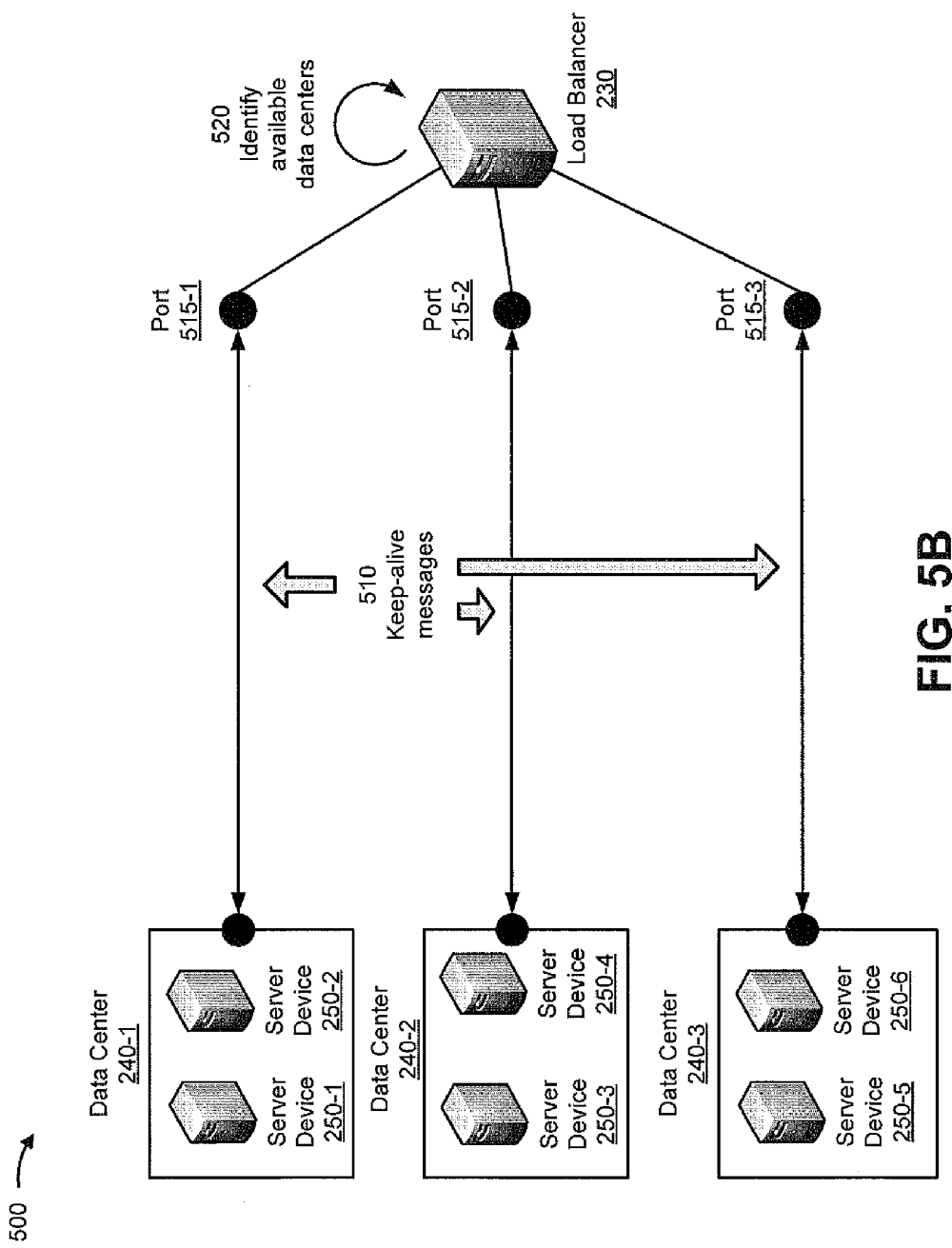

As shown in FIG. 5B, and by reference number 510, load balancer 230 has established keep-alive listening (e.g., via keep-alive messages) to determine a set of available data centers 240 that include server devices 250 associated with providing the requested billing service to the originating IP address associated with client device 210. Assume that port 515-1 is associated with data center 240-1, port 515-2 is associated with data center 240-2, and port 515-3 is associated with data center 240-3. Assume that data center 240-1 includes server device 250-1 and server device 250-2, data center 240-2 includes server device 250-3 and server device 250-4, and data center 240-3 includes server device 250-5 and server device 250-6. As shown by reference number 520, load balancer 230 determines that data center 240-1, data center 240-2, and data center 240-3 are available based on the keep-alive messages.

Figure 5C:
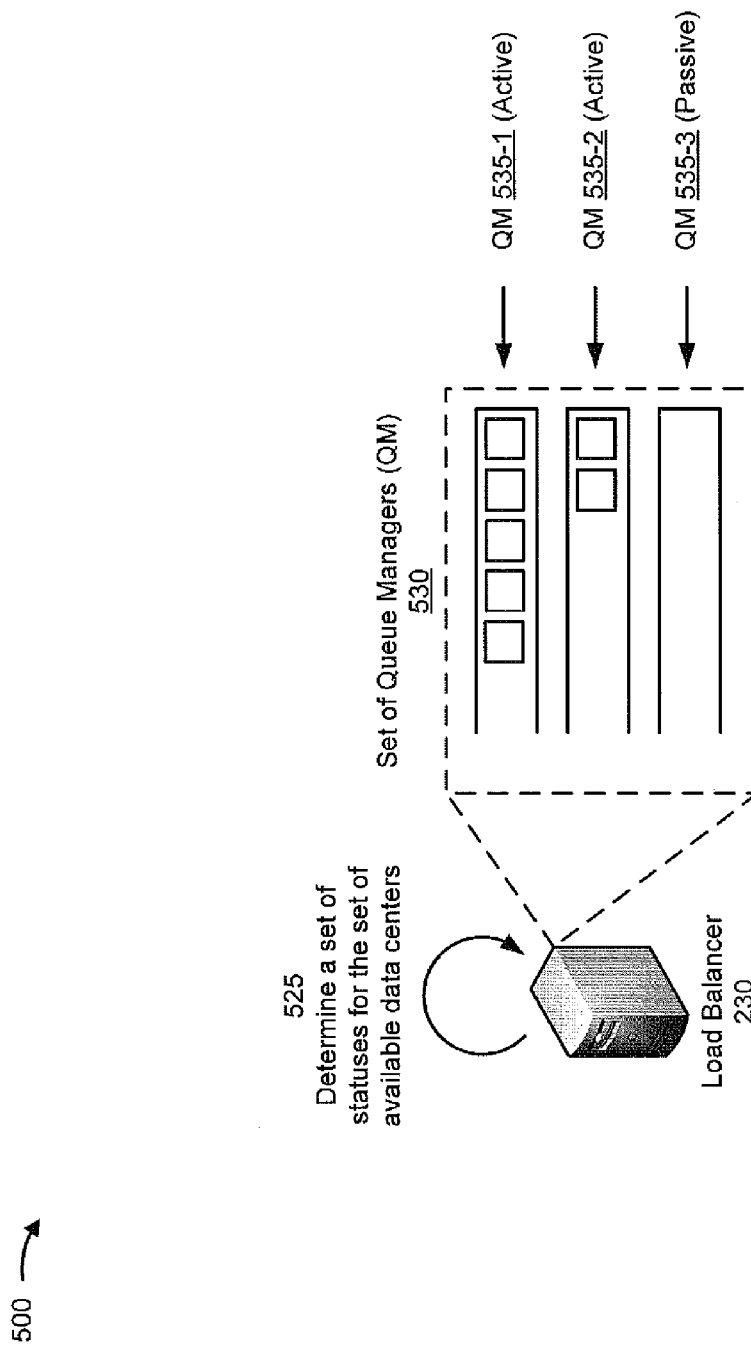

As shown in FIG. 5C, and by reference number 525, load balancer 230 determines a set of statuses, and updates a set of queue managers 530 (e.g., associated with queue manager 535-1, queue manager 535-2, and queue manager 535-3) based on the set of statuses. Assume that queue manager 535-1 is associated with data center 240-1 and an active status, queue manager 535-2 is associated with data center 240-2 and an active status, and queue manager 535-3 is associated with data center 240-3 and a passive status. Assume that load balancer 230 determines a particular routing rule indicating that requests are to be assigned to a particular queue manager associated with an active, available data center 240.

Figure 5D:
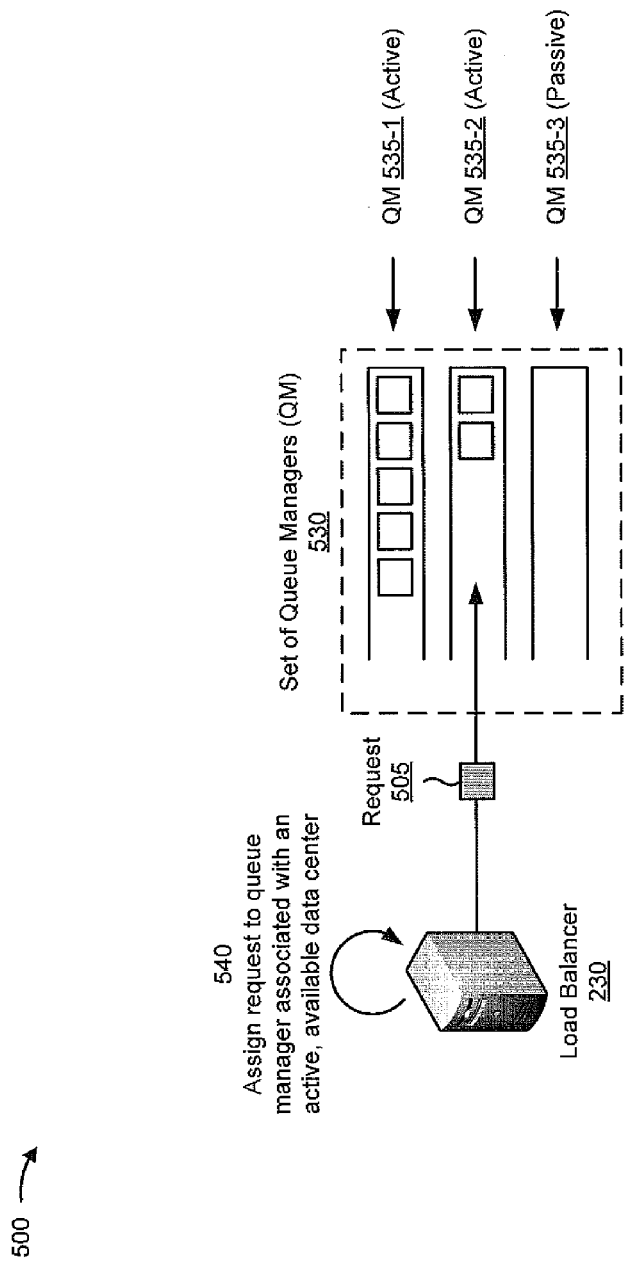
Figure 5F:
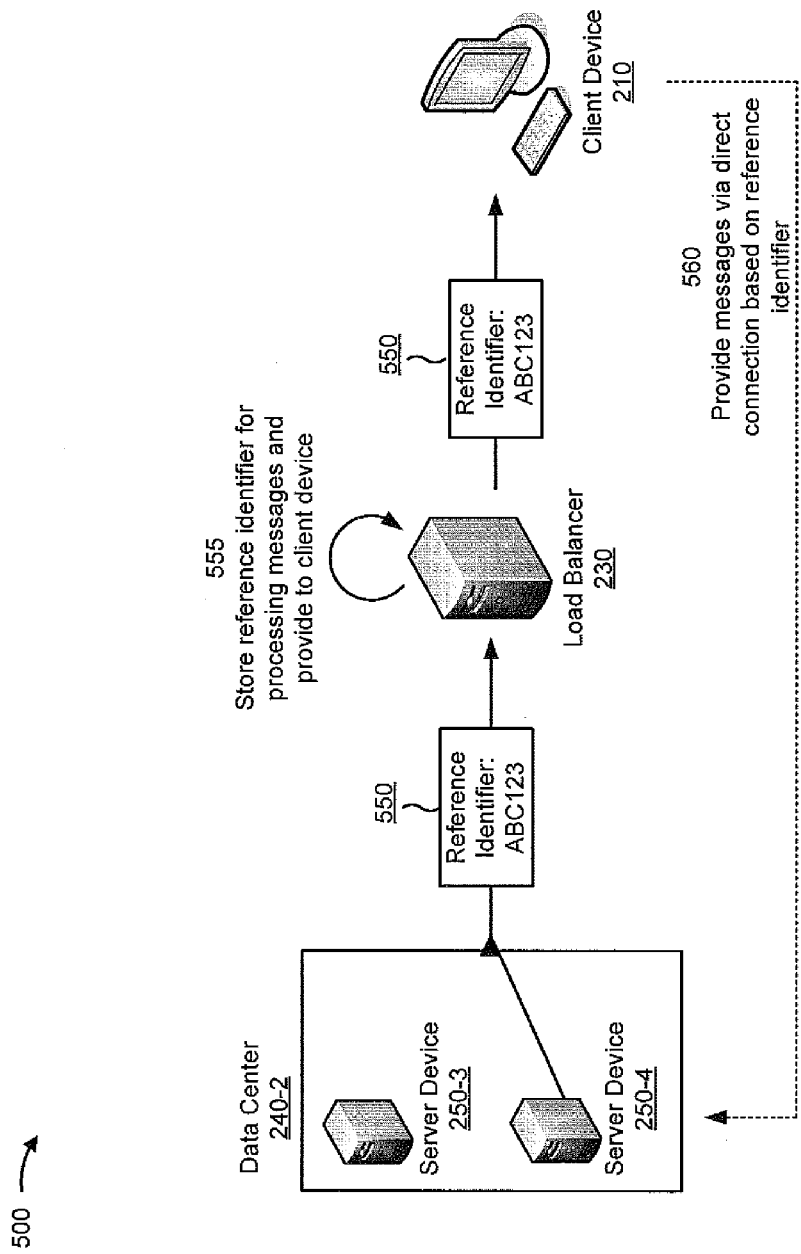

As shown in FIG. 5D, and by reference number 540, load balancer 230 assigns request 505 to queue manager 535-2 associated with data center 240-2 (e.g., based on the particular routing rule). As shown in FIG. 5E, and by reference number 545, request 505 is provided by load balancer 230 via queue manager 535-2 to data center 240-2, and is routed to server device 250-4. As shown in FIG. 5F, server device 250-4 processes request 505 and generates reference identifier 550 (e.g., "ABC123"). As shown by reference number 555, load balancer 230 receives information identifying reference identifier 550, stores information associated with reference identifier 550 (e.g., for further processing messages between client device 210 and server device 250-4), and provides information identifying reference identifier 550 to client device 210. As shown by reference number 560, client device 210 may provide further messages to server device 250-4 via a direct connection established based on reference identifier 550. In another example, client device 210 may provide the further messages via load balancer 230 based on reference identifier 550.

As indicated above, FIGS. 5A-5F are provided merely as an example. Other examples are possible and may differ from what was described with regard to FIGS. 5A-5F.

FIG. 6 is a flow chart of an example process for re-assigning a client device messaging connection with a data center. In some implementations, one or more process blocks of FIG. 6 may be performed by load balancer 230. Additionally, or alternatively, one or more process blocks of FIG. 6 may be performed by another device or a group of devices separate from or including load balancer 230, such as client device 210, data center 240, and/or server device 250.

As shown in FIG. 6, process 600 may include receiving a message for a first data center (block 610). For example, load balancer 230 may receive the message from client device 210 for first data center 240. In some implementations, load balancer 230 may determine that first data center 240 is to be the recipient of the message based on a reference identifier. For example, load balancer 230 may determine that a reference identifier, included in the message, is associated with first data center 240 based on querying a data structure storing reference identifier information. In some implementations, the message may be associated with a particular server device 250 associated with first data center 240.

As further shown in FIG. 6, process 600 may include determining that the first data center is unavailable (block 620). For example, load balancer 230 may determine that first data center 240 is unavailable based on a keep-alive listener. Additionally, or alternatively, load balancer 230 may determine that first data center 240 is unavailable based on receiving an error when attempting to provide the message. In some implementations, load balancer 230 may determine that first data center 240 is unavailable when the message is received. Additionally, or alternatively, load balancer 230 may determine that first data center 240 is unavailable based on a threshold quantity of time being satisfied, a threshold quantity of messages being received, or the like as discussed herein in connection with FIG. 4.

As further shown in FIG. 6, process 600 may include determining that a second data center is available based on determining that the first data center is unavailable (block 630). For example, load balancer 230 may determine that second data center 240 is available based on determining that first data center 240 is unavailable. In some implementations, load balancer 230 may determine that second data center 240 is available based on receiving a keep-alive message via a keep-alive listener on a port associated with second data center 240 as discussed herein in connection with FIG. 4.

As further shown in FIG. 6, process 600 may include configuring message routing based on determining that the second data center is available (block 640). For example, load balancer 230 may configure message routing based on determining that second data center 240 is available. In some implementations, load balancer 230 may update one or more queue managers of a set of queue managers when configuring message routing. For example, load balancer 230 may remove a queue manager associated with unavailable first data center 240, may disable a queue manager associated with unavailable first data center 240, may add a queue manager associated with available second data center 240, may enable a queue manager associated with available second data center 240, or the like.

Load balancer 230 may modify a status associated with one or more data centers 240 when configuring message routing, in some implementations. For example, when second data center 240 is associated with a passive status (e.g., a backup status), load balancer 230 may adjust the status associated with second data center 240 to be an active status. In this case, load balancer 230 may return the status associated with second data center 240 to the passive status when first data center 240 is determined to have resumed availability.

Load balancer 230 may re-assign a particular message of a first queue manager associated with first data center 240 to a second queue manager associated with second data center 240 when configuring message routing, in some implementations. Additionally, or alternatively, load balancer 230 may drop the particular message of the first queue manager, and may provide information notifying client device 210 that the particular message has been dropped. Additionally, or alternatively load balancer 230 may re-assign a first particular message from the first queue manager to the second queue manager, and may drop a second particular message from the first queue manager. In some implementations, load balancer 230 may re-assign the particular message based on a threshold quantity of time being satisfied, a threshold quantity of other messages (e.g., that include a reference identifier associated with first data center 240) being received, a threshold quantity of keep-alive messages being dropped, or the like.

In some implementations, when load balancer 230 identifies multiple second queue managers associated with multiple second data centers 240, load balancer 230 may re-assign multiple messages of a first queue manager associated with first data center 240 to a particular second queue manager of the multiple second queue managers based on a routing rule as discussed herein in connection with FIG. 4. Additionally, or alternatively, load balancer 230 may re-assign a first particular message of the multiple messages to a first particular second queue manager, and may re-assign a second particular message of the multiple messages to a second particular second queue manager (e.g., based on a routing rule).

Load balancer 230 may, when configuring message routing, store information associated with returning a re-assigned message from the second queue manager to the first queue manager when first data center 240 becomes available again, in some implementations. For example, load balancer 230 may store information identifying a particular message that is re-assigned from the first queue manager (e.g., associated with first data center 240) to the second queue manager (e.g., associated with second data center 240). In this case, when first data center 240 is determined to have become available again, load balancer 230 may identify the particular message that has been re-assigned to the second queue manager, and may re-assign the particular message back to the first queue manager. Additionally, or alternatively, load balancer 230 may avoid re-assigning the particular message back to the first queue manager, and may assign another message (e.g., that includes a reference identifier associated with first data center 240) to the first queue manager, when the other message is received.

Load balancer 230 may determine another routing rule when configuring message routing, in some implementations. For example, load balancer 230 may access a routing rule based on determining that first data center 240 is unavailable as discussed herein in connection with FIG. 4.

As further shown in FIG. 6, process 600 may include assigning the message to the second data center based on configuring message routing (block 650). For example, load balancer 230 may assign the message to second data center 240 based on configuring message routing. In some implementations, load balancer 230 may assign the message to a local queue manager associated with providing messages to second data center 240. For example, load balancer 230 may provide information, to a local queue manager associated with load balancer 230, that the message is to be provided to an external queue manager associated with second data center 240.

Load balancer 230 may provide information identifying second data center 240 when assigning the message, in some implementations. For example, load balancer 230 may generate a reference identifier for second data center 240, may store the reference identifier, and may provide information identifying the reference identifier to client device 210. Additionally, or alternatively, load balancer 230 may receive a reference identifier from second data center 240, server device 250, or the like.

In this way, a load balancer may provide failure protection by determining that a data center is unavailable, and by assigning a message to another data center that is available.

While systems and methods may be described herein in terms of a first data center and a second data center, the systems and methods may also be implemented in terms of a first data center and multiple other data centers.

Although FIG. 6 shows example blocks of process 600, in some implementations, process 600 may include additional blocks, different blocks, fewer blocks, or differently arranged blocks than those depicted in FIG. 6. Additionally, or alternatively, two or more blocks of process 600 may be performed in parallel.

Figure 7B:
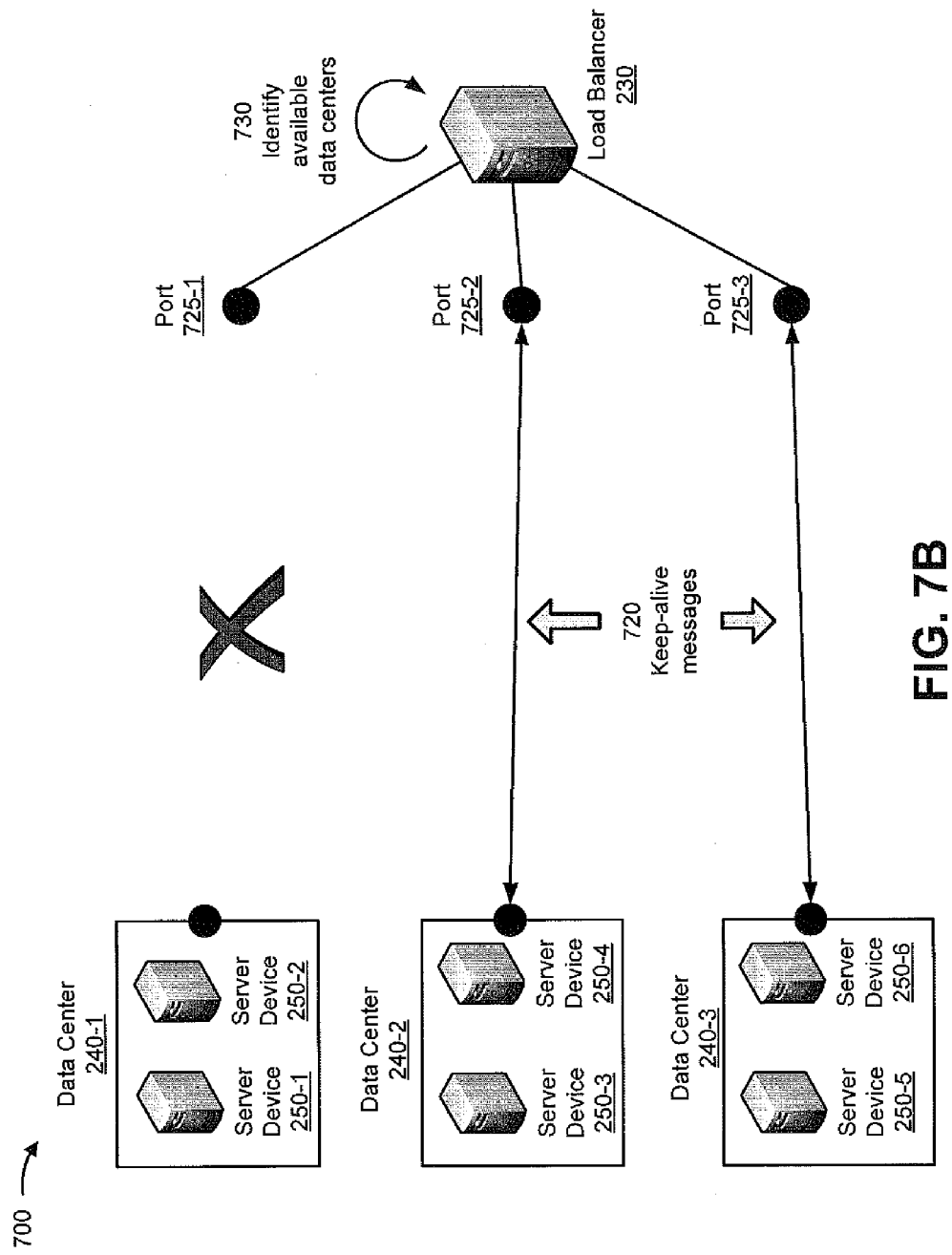

FIGS. 7A-7K are diagrams of an example implementation 700 relating to process 600 shown in FIG. 6. As shown in FIG. 7A, example implementation 700 includes client device 210, load balancer 230, and server device 250-1. Load balancer 230 receives message 705-1 from client device 210. Assume that message 705-1 includes a reference identifier indicating that the message is to be provided to server device 250-1. As shown by reference number 710, load balancer 230 determines that a local queue manager associated with server device 250-1 is enabled. Load balancer 230 provides message 705-1 to server device 250-1 via the local queue manager of a set of local queue managers 715.

As shown in FIG. 7B, and by reference number 720, load balancer 230 receives keep-alive messages via a set of ports. Assume that port 725-1 is associated with receiving keep-alive messages from data center 240-1, port 725-2 is associated with receiving keep-alive messages from data center 240-2, and port 725-3 is associated with receiving keep-alive messages from data center 240-3. As shown by reference number 730, load balancer 230 determines that data center 240-1 is unavailable, data center 240-2 is available, and data center 240-3 is available based on the keep-alive messages.

Figure 7C:
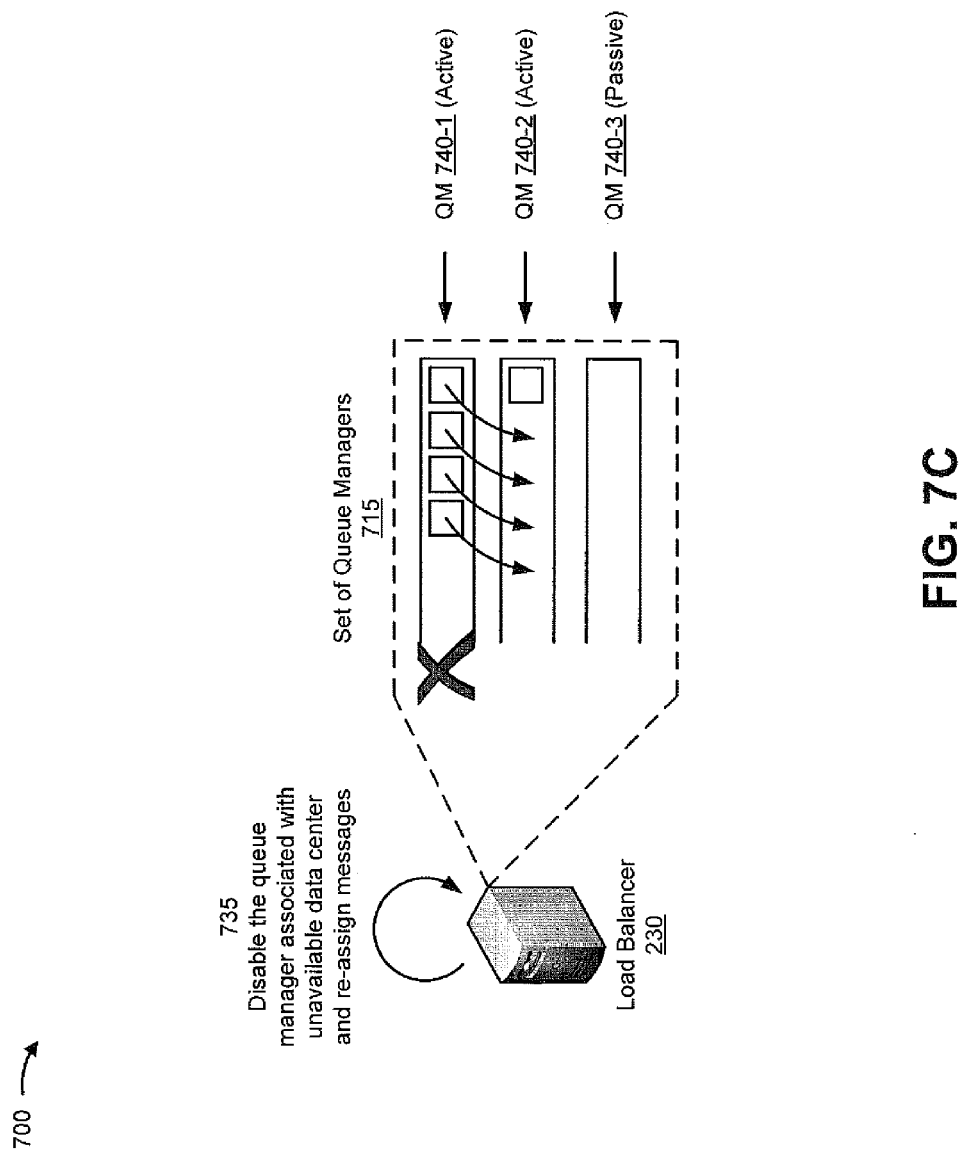

As shown in FIG. 7C, and by reference number 735, load balancer 230 determines to disable a queue manager associated with unavailable data center 240-1. Assume that queue manager 740-1 is associated with unavailable, active data center 240-1, queue manager 740-2 is associated with available, active data center 240-2, and queue manager 740-3 is associated with available, passive data center 240-3. Load balancer 230 re-assigns messages from queue manager 740-1 to queue manager 740-2 based on disabling queue manager 740-1.

Figure 7D:
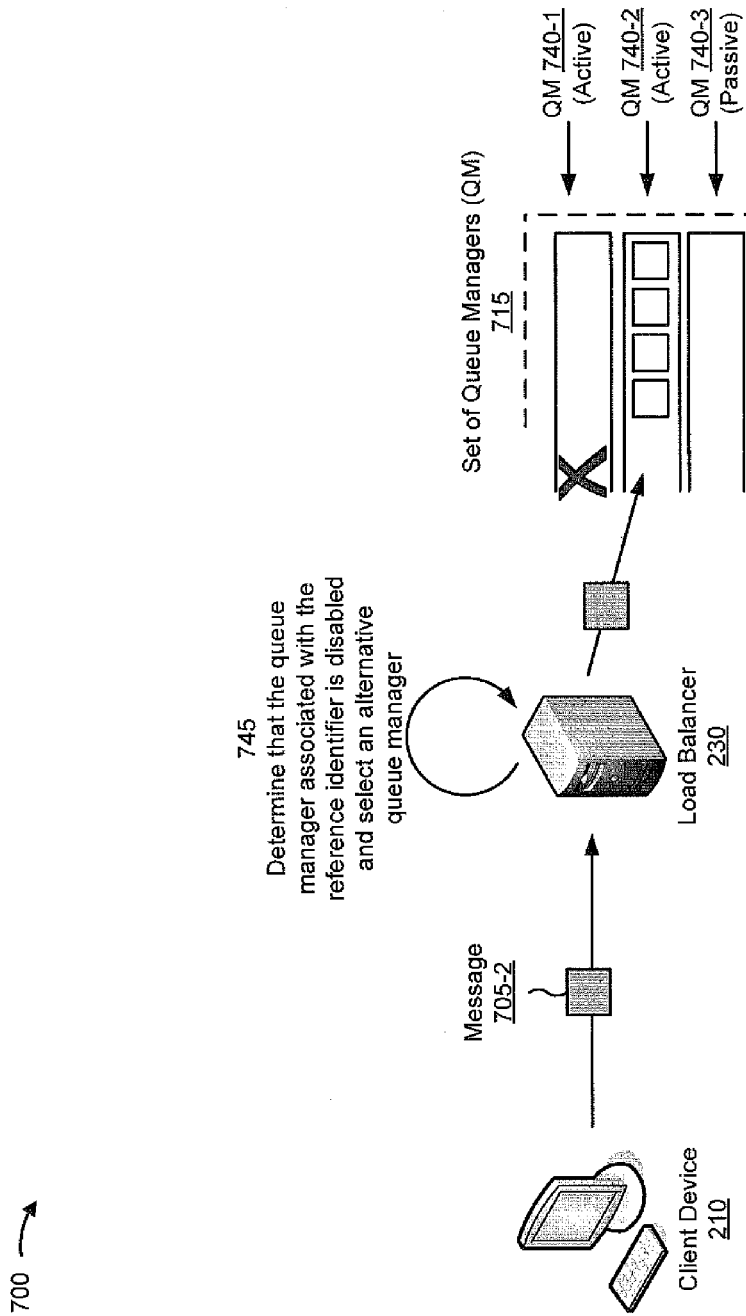
Figure 7E:
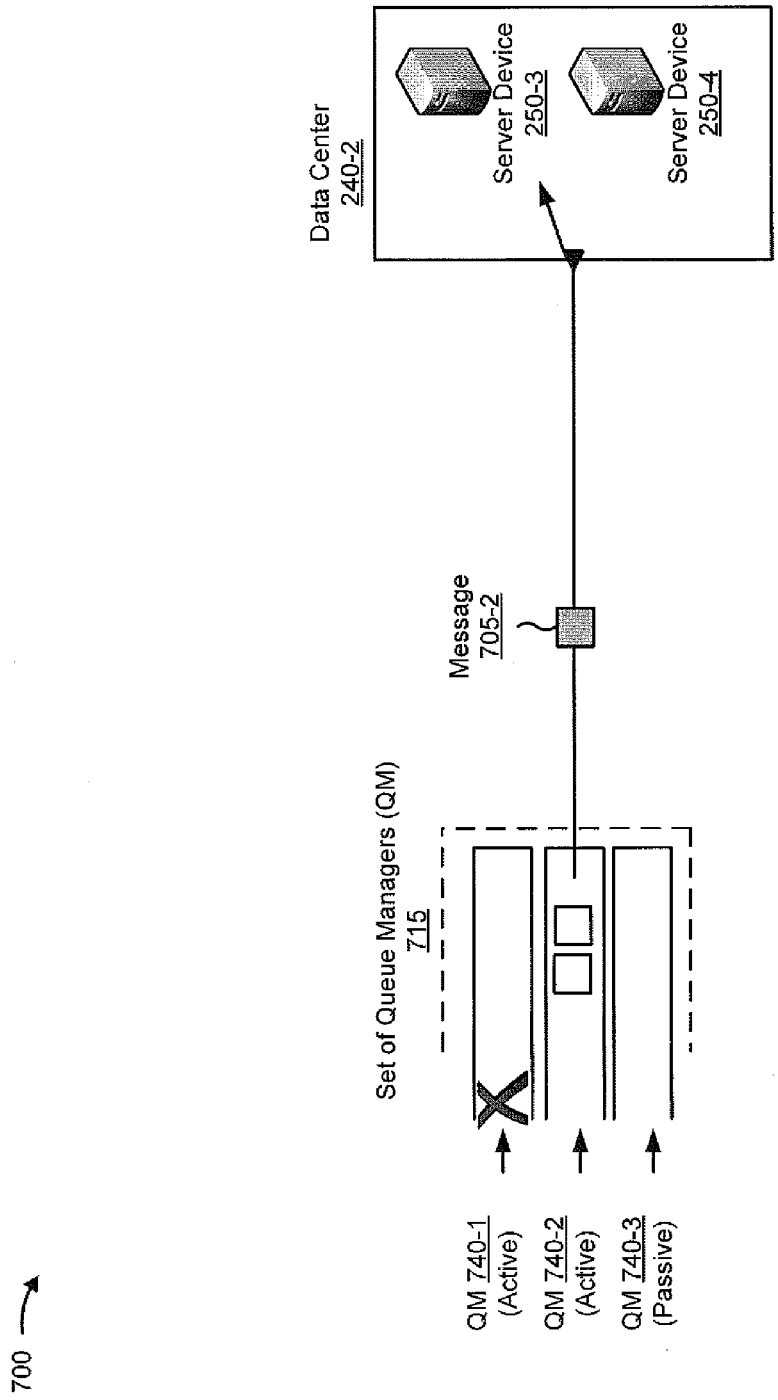

As shown in FIG. 7D, load balancer 230 receives message 705-2 from client device 210. As shown by reference number 745, load balancer 230 determines that a reference identifier included in message 705-2 indicates that message 705-2 is to be provided to server device 250-1 (e.g., associated with data center 240-1). Load balancer 230 determines that queue manager 740-1 is disabled (e.g., data center 240-1 is unavailable). Load balancer 230 selects queue manager 740-2 (e.g., associated with available, active data center 240-2), and re-assigns message 705-2 to queue manager 740-2. As shown in FIG. 7E, message 705-2 is provided via queue manager 740-2 to server device 250-3 (e.g., via data center 240-2).

As shown in FIG. 7F, and by reference number 750, load balancer receives keep-alive messages via port 725-3, indicating that data center 240-3 is available. As shown by reference number 755, load balancer 230 determines that data center 240-1 is unavailable, data center 240-2 is unavailable, and data center 240-3 is available based on the keep-alive messages.

Figure 7G:
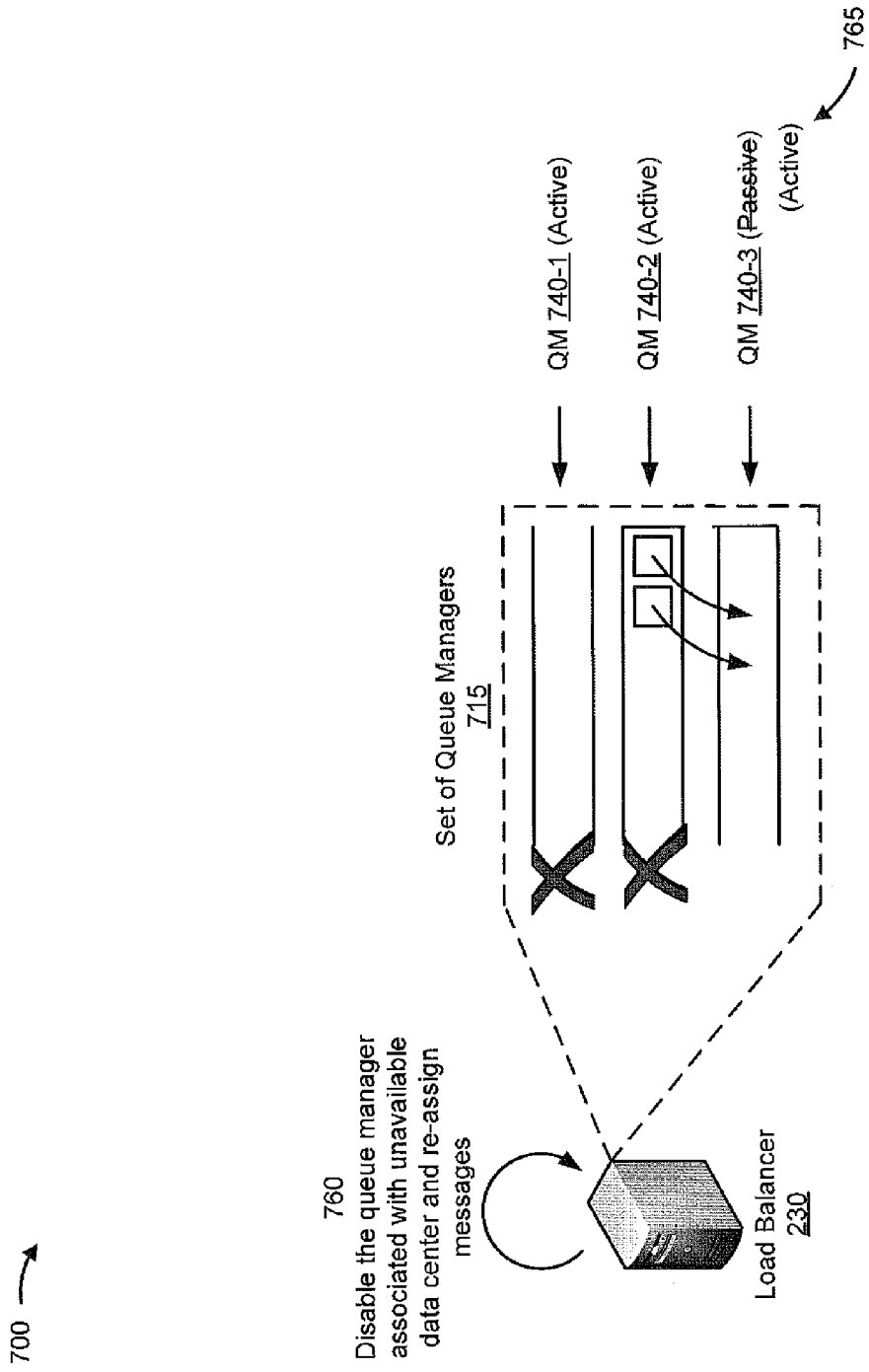

As shown in FIG. 7G, and by reference number 760, load balancer 230 disables queue manager 740-2 associated with unavailable, active data center 240-2. Load balancer 230 re-assigns messages of queue manager 740-2 to queue manager 740-3 (e.g., associated with available, passive data center 240-3) based on disabling queue manager 740-2. As shown by reference number 765, load balancer 230 adjusts data center 240-3 from passive status to active status.

Figure 7H:
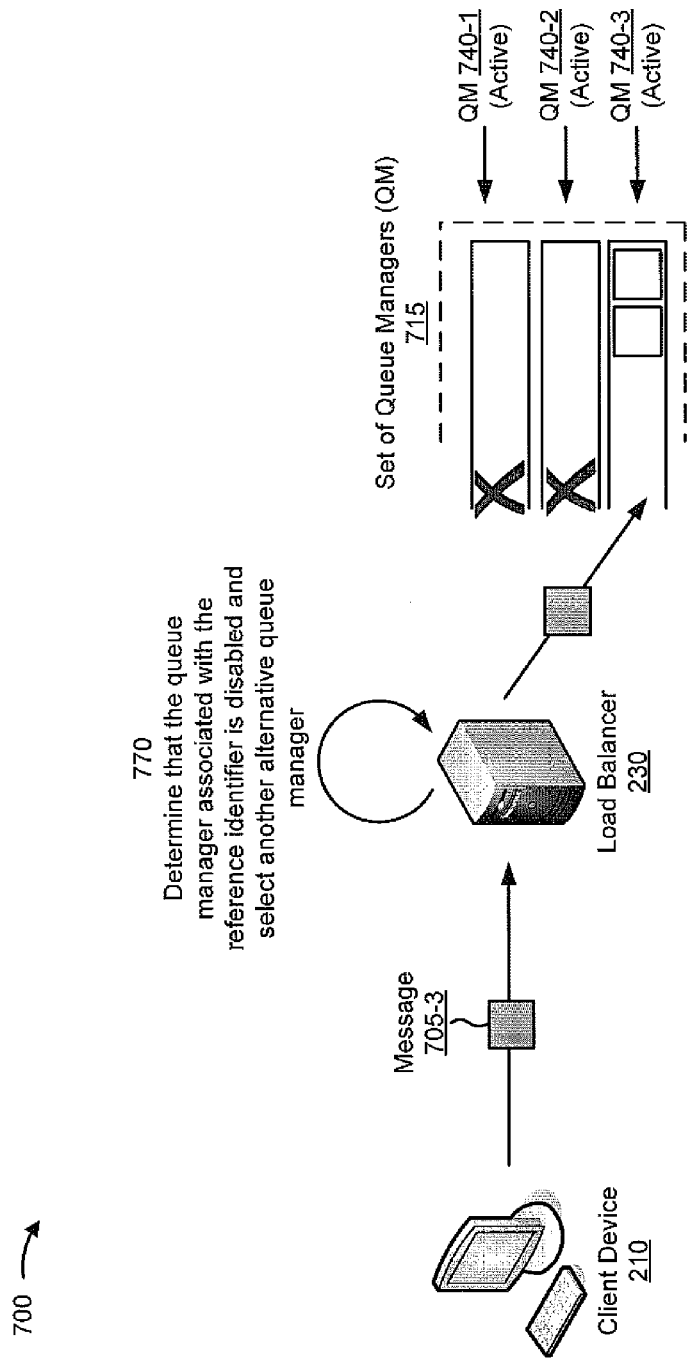

As shown in FIG. 7H, load balancer 230 receives message 705-3 from client device 210. As shown by reference number 770, load balancer 230 determines that message 705-3 is intended for server device 250-1 (e.g., associated with data center 240-1) based on a reference identifier included in message 705-3. Load balancer 230 determines to re-assign message 705-3 to data center 240-3 via queue manager 740-3 based on determining that queue manager 740-1 and queue manager 740-2 are disabled. Assume that message 705-3 is provided from queue manager 740-3 to server device 250-6 (e.g., via data center 240-3).

As shown in FIG. 7I, and by reference number 775, load balancer 230 receives keep-alive messages from data center 240-1 (e.g., via port 725-1), and from data center 240-3 (e.g., via port 725-3). As shown by reference number 780, load balancer 230 determines that data center 240-1 is available, data center 240-2 is unavailable, and data center 240-3 is available.

Figure 7J:
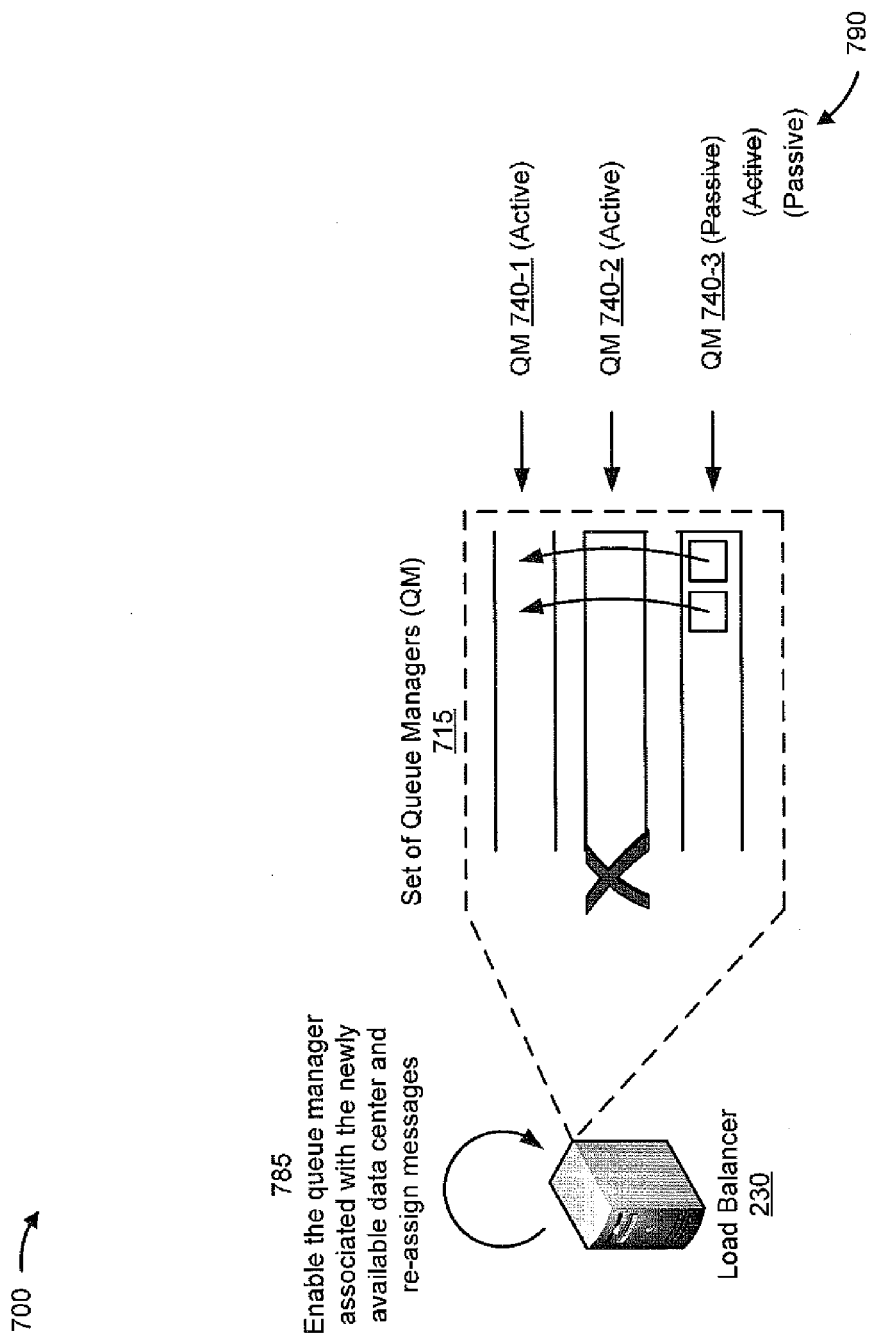

As shown in FIG. 7J, and by reference number 785, load balancer enables queue manager 740-1 associated with available data center 240-1. Load balancer 230 re-assigns messages from queue manager 740-3 to queue manager 740-1 based on enabling queue manager 740-1. As shown by reference number 790, load balancer 230 returns the status of queue manager 740-3 from active status to passive status.

Figure 7K:
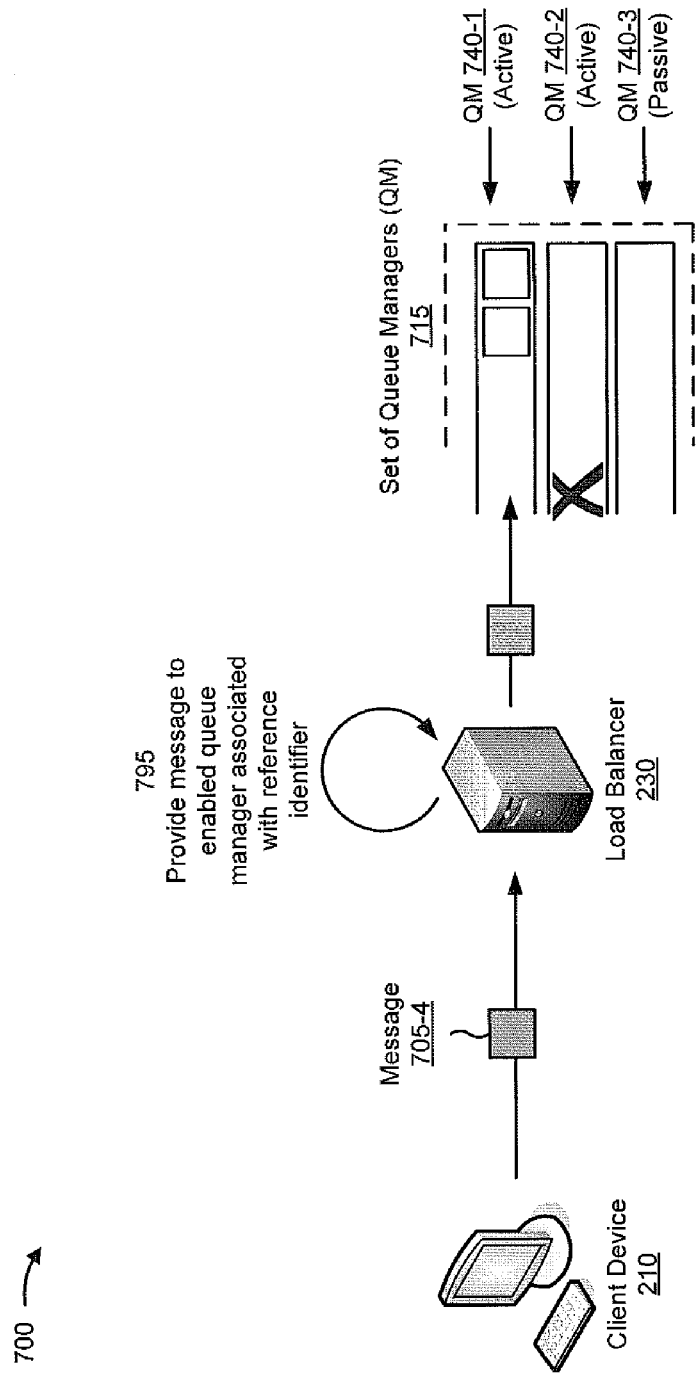

As shown in FIG. 7K, load balancer 230 receives message 705-4 from client device 210. Load balancer 230 determines that message 705-4 is to be provided to server device 250-1 (e.g., associated with data center 240-1) based on a reference identifier included in message 705-4. Load balancer 230 assigns message 705-4 to queue manager 740-1 based on determining that queue manager 740-1 is enabled (e.g., data center 240-1 is available). Assume that message 705-4 is provided from queue manager 740-1 to server device 250-1 (e.g., via data center 240-1).

As indicated above, FIGS. 7A-7K are provided merely as an example. Other examples are possible and may differ from what was described with respect to FIGS. 7A-7K.

Implementations described herein may assist a load balancer, such as a global server load balancer, or the like, in providing messaging between a client device and a server (e.g., of a set of servers) associated with a data center (e.g., of a set of data centers) using a set of queue managers. Furthermore, implementations described herein may assist the load balancer in maintaining messaging during data center unavailability by reassigning a message to another queue manager of the set of queue managers associated with another data center.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive a request for messaging from a client device;
determine a set of available data centers, of a plurality of data centers, based on data being received at a set of networking ports of the device;
configure a set of local queue managers to provide messaging to a set of external queues, associated with a set of external queue managers and associated with the set of available data centers, based on determining the set of available data centers;
determine a length of each external queue of the set of external queues;
determine that a particular length of a particular external queue, associated with a particular external queue manager, of the set of external queue managers, that is associated with a particular data center of the set of available data centers, is shorter than a respective length of each other external queue of the set of external queues;
assign the request to a particular local queue manager, of the set of local queue managers, associated with providing messaging to the particular external queue manager, based on determining that the particular length of the particular external queue is shorter than the length of each other external queue of the set of external queues;
provide the request to the particular data center via the particular local queue manager and the particular external queue manager associated with the particular data center; and
determine a reference identifier based on providing the request to the particular data center,
the reference identifier being associated with the particular data center and permitting messages from the client device to be forwarded to the particular data center.

2. The device of claim 1, where the one or more processors are further to:
receive a particular message from the client device;
determine that the particular message includes the reference identifier associated with the particular data center; and
provide the particular message to the particular data center via the particular local queue manager and the particular external queue manager based on determining that the particular message includes the reference identifier.

3. The device of claim 1, where the one or more processors are further to:
receive a particular message from the client device;
determine that the particular message includes the reference identifier associated with the particular data center;
determine that the particular data center, associated with the reference identifier, is unavailable;
determine, based on determining that the particular data center is unavailable, that another data center, of the set of available data centers, is available;
configure message routing based on determining that the other data center is available; and
provide the message to the other data center via another local queue manager of the set of local queue managers and another external queue manager of the set of external queue managers based on configuring message routing,
the other external queue manager being associated with the other data center.

4. The device of claim 3, where the one or more processors are further to:
determine that the particular local queue manager associated with the particular data center includes one or more other messages;
assign the one or more other messages to the other local queue manager of the set of local queue managers,
the other local queue manager being configured to provide messages to the other external queue manager for the other data center; and
provide the one or more other messages to the other data center via the other local queue manager and the other external queue manager.

5. The device of claim 1, where the one or more processors are further to:
connect the particular local queue manager to the particular external queue manager associated with the particular data center; and
where the one or more processors, when providing the request to the particular data center via the particular local queue manager and the particular external queue manager, are to:
provide the request based on connecting the particular local queue manager to the particular external queue manager.

6. The device of claim 1, where the one or more processors are further to:
determine an active status for the particular data center,
the active status indicating that the particular data center is configured to receive the request;
determine a passive status for one or more other data centers of the set of available data centers,
the passive status indicating that the one or more other data centers are configured to provide backup messaging for the particular data center; and
where the one or more processors, when assigning the request to the particular local queue manager, are to:
assign the request to the particular local queue manager based on determining the active status for the particular data center and determining the passive status for the one or more other data centers.

7. The device of claim 1, where the one or more processors are further to:
determine queue lengths for a set of local queues associated with the set of local queue managers;
determine a routing rule associated with assigning requests,
the routing rule indicating that requests are to be assigned based on queue length; and
where the one or more processors, when assigning the request to the particular local queue manager, are to:
assign the request to the particular local queue manager based on the routing rule and the queue lengths.

8. A computer-readable medium storing instructions, the instructions comprising:
one or more instructions that, when executed by one or more processors, cause the one or more processors to:
receive, from a client device, a request for messaging to be established;
send a plurality of keep-alive messages to a plurality of data centers;

determine a set of available data centers, of the plurality of data centers, based on the plurality of keep-alive messages;

configure a set of local queue managers to provide messaging to a set of external queues, associated with a set of external queue managers and associated with the set of available data centers, based on determining that the set of available data centers;

determine a length of each external queue of the set of external queues;

determine that a particular length of a particular external queue, associated with a particular external queue manager, of the set of external queue managers, that is associated with a particular data center of the set of available data centers, is shorter than a respective length of each other external queue of the set of external queues;

assign the request to a particular local queue manager, of the set of local queue managers, associated with providing messaging to the particular external queue manager, based on determining that the particular length of the particular external queue is shorter than the length of each other external queue of the set of external queues;

provide the request to the particular data center via the particular local queue manager and the particular external queue manager associated with the particular data center;

receive information acknowledging receipt of the request from the particular data center; and provide a reference identifier for routing messages associated with the request based on receiving the information acknowledging receipt of the request.

9. The computer-readable medium of claim 8, where the one or more instructions, when executed by the one or more processors, further cause the one or more processors to:

receive, from the client device, another request for messaging to be established;

send another plurality of keep-alive messages to the plurality of data centers;

determine that the particular data center is unavailable based on the other plurality of keep-alive messages;

determine that another data center, of the plurality of data centers, is available based on the other plurality of keep-alive messages;

determine that the other data center is associated with a passive status,
the passive status indicating that the other data center is configured to backup the particular data center;

configure the other data center to be associated with an active status,
the active status indicating that the other data center is configured to receive the other request; and provide the other request to the other data center based on configuring the other data center to be associated with the active status.

10. The computer-readable medium of claim 8, where the one or more instructions, when executed by the one or more processors, further cause the one or more processors to:

determine that a received message includes the reference identifier;

determine that the particular data center is available based on determining that the received message includes the reference identifier;

assign the message to the particular local queue manager based on determining that the particular data center is available and that the message includes the reference identifier; and provide the message to the particular data center via the particular local queue manager and the particular external queue manager based on assigning the message to the particular local queue manager.

11. The computer-readable medium of claim 8, where the one or more instructions, when executed by the one or more processors, further cause the one or more processors to:

determine that a received message includes the reference identifier;

determine that the particular data center is not available based on determining that the received message includes the reference identifier;

identify another available data center, of the plurality of data centers, based on determining that the particular data center is not available;

assign the message to another local queue manager,
the other local queue manager being configured to provide messaging to another external queue manager associated with the other data center;

provide the message to the other data center via the local queue manager and the other external queue manager based on assigning the request to the other local queue manager; and provide another reference identifier associated with routing messages based on providing the message to the other data center.

12. The computer-readable medium of claim 8, where the one or more instructions, when executed by the one or more processors, further cause the one or more processors to:

determine a set of statuses associated with the set of available data centers of the plurality of data centers,
the set of statuses indicating that particular data centers of the set of available data centers are configured to receive messages,
the particular data center being one of the particular data centers; and where the one or more instructions, that cause the one or more processors to assign the request to the particular local queue manager, cause the one or more processors to:
assign the request based on determining the set of statuses.

13. The computer-readable medium of claim 8, where the one or more instructions, when executed by the one or more processors, further cause the one or more processors to:

determine a routing rule,
the routing rule being associated with selectively assigning a set of requests to particular data centers of the plurality of data centers,
the particular data center being one of the particular data centers; and where the one or more instructions, that cause the one or more processors to assign the request to the particular local queue manager, cause the one or more processors to:
assign the request based on the routing rule.

14. The computer-readable medium of claim 8, where the one or more instructions, when executed by the one or more processors, further cause the one or more processors to:

establish an association between a plurality of ports and the plurality of data centers;

where the one or more instructions, that cause the one or more processors to send the plurality of keep-alive messages to the plurality of data centers, cause the one or more processors to send the plurality of keep-alive messages to the plurality of data centers via the plurality of ports;
receive responses to the plurality of keep-alive messages from the set of available data centers of the plurality of data centers; and
where the one or more instructions, that cause the one or more processors to determine the set of available data centers of the plurality of data centers, cause the one or more processors to:
 determine the set of available data centers based on receiving the responses to the plurality of keep-alive messages from the set of available data centers.

15. A method, comprising:
receiving, by a device, a particular message to be processed;
sending, by the device, a plurality of keep-alive messages to a plurality of data centers,
 the plurality of data centers including servers associated with processing messages;
determining, by the device, a set of available data centers, of the plurality of data centers, based on sending the plurality of keep-alive messages;
configuring, by the device, a set of local queue managers, the set of local queue managers being associated with providing messaging to a set of external queues,
 the set of external queues being associated with a set of external queue managers,
  the set of external queue managers being associated with the set of available data centers;
determining, by the device, a length of each external queue of the set of external queues;
determining, by the device, that a particular length of a particular external queue, associated with a particular external queue manager, of the set of external queue managers, that is associated with a particular data center of the set of available data centers, is shorter than a respective length of each other external queue of the set of external queues;
assigning, by the device, the particular message to a particular local queue manager, of the set of local queue managers associated with providing messaging to the particular external queue manager,
providing, by the device, the particular message to the particular data center via the particular local queue manager and a particular external queue manager, associated with the particular data center;
obtaining, by the device, a reference identifier for other messages to be provided to the particular data center; and
assigning, by the device, another message associated with the reference identifier to the particular local queue manager.

16. The method of claim 15, further comprising:
sending another plurality of keep-alive messages;
determining, based on the other plurality of keep-alive messages, that the particular data center is unavailable;
assigning one or more messages of the particular local queue manager to another local queue manager that is associated with providing messages to another data center of the set of available data centers; and
providing, via the other local queue manager, the one or more messages to another external queue manager associated with the other data center based on assigning the one or more messages to the other local queue manager.

17. The method of claim 15, further comprising:
providing the reference identifier to a client device associated with the particular message;
storing an indication of the reference identifier; and
where assigning the other message associated with the reference identifier to the particular local queue manager comprises:
 determining that the other message is associated with the reference identifier based on the stored indication of the reference identifier; and
 assigning the other message to the particular local queue manager based on determining that the other message is associated with the reference identifier.

18. The method of claim 15, where the particular data center is associated with a particular plurality of server devices; and
the method further comprises:
 identifying a server device, of the particular plurality of server devices, to be provided the message; and
 generating another reference identifier associated with the identified server device.

19. The method of claim 15, further comprising:
determining that the particular local queue manager satisfies a threshold quantity of messages to be provided to the particular data center;
reassigning a quantity of messages from the particular local queue manager to one or more other local queue managers associated with one or more other data centers, of the set of available data centers, based on determining that the particular local queue manager satisfies the threshold quantity of messages; and
providing information identifying the one or more other data centers to one or more client devices associated with the quantity of messages.

20. The method of claim 15, further comprising:
adding another data center to the plurality of data centers;
sending another keep-alive message to the other data center;
determining that the other data center is available based on sending the other keep-alive message;
configuring another local queue manager associated with providing messaging to another external queue manager, associated with the other data center, based on determining that the other data center is available;
updating the set of local queue managers to include the other local queue manager; and
assigning the message to the other local queue manager, rather than the particular local queue manager, based updating the set of local queue managers.

* * * * *